United States Patent
Zheng et al.

(10) Patent No.: US 12,423,578 B1
(45) Date of Patent: Sep. 23, 2025

(54) DISTRIBUTED TRAINING OF MACHINE LEARNING MODELS

(71) Applicant: Amazon Technologies, Inc., Seattle, WA (US)

(72) Inventors: Shuai Zheng, Santa Clara, CA (US); Zhen Zhang, Baltimore, MD (US); Yida Wang, Palo Alto, CA (US); Justin Chiu, Seattle, WA (US); George Karypis, Bloomington, MN (US); Trishul Amit Madhukar Chilimbi, Seattle, WA (US); Mu Li, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 849 days.

(21) Appl. No.: 17/707,768

(22) Filed: Mar. 29, 2022

Related U.S. Application Data

(60) Provisional application No. 63/303,379, filed on Jan. 26, 2022.

(51) Int. Cl.
*G06N 3/08* (2023.01)
*G06N 3/063* (2023.01)

(52) U.S. Cl.
CPC .............. *G06N 3/08* (2013.01); *G06N 3/063* (2013.01)

(58) Field of Classification Search
CPC .................................. G06N 3/063; G06N 3/08
See application file for complete search history.

(56) References Cited

U.S. PATENT DOCUMENTS

| | | | |
|---|---|---|---|
| 2019/0205745 A1* | 7/2019 | Sridharan | G06N 3/04 |
| 2021/0073336 A1* | 3/2021 | Fox | G06N 3/044 |
| 2022/0284271 A1* | 9/2022 | Park | G06F 11/3062 |

OTHER PUBLICATIONS

M. Shoeybi, et al., "Megatron-LM: Training Multi-Billion Parameter Language Models Using Model Parallelism," arXiv preprint arXiv:1909.08053, 2020, p. 1-15.
J. Devlin, et al., "BERT: Pre-training of Deep Bidirectional Transformers for Language Understanding," arXiv preprint arXiv:1810.04805, 2018, pp. 1-16.
Y. Zhang, et al., "Pushing the Limits of Semi-Supervised Learning for Automatic Speech Recognition," arXiv preprint arXiv:2010.10504 [eess.AS], pp. 1-11.

(Continued)

*Primary Examiner* — Eric J. Bycer
(74) *Attorney, Agent, or Firm* — Robert C. Kowert; Kowert, Hood, Munyon, Rankin & Goetzel, P.C.

(57) ABSTRACT

A resource set which includes multiple servers with a respective plurality of training computing devices is identified for training a machine learning model. The resource set is subdivided into partition groups, such that each partition group can store a respective replica of state information of the model. The model is trained using the partition groups. The training comprises a multi-stage gathering of a portion of the state information at training computing devices of a particular partition group. Different types of communication channels between training computing devices are used in respective stages of the gathering, including inter-server communication channels in one stage and an intra-server communication channel during another stage. A trained version of the model is stored.

20 Claims, 11 Drawing Sheets

(56) References Cited

OTHER PUBLICATIONS

Yu-An Chung, Yu Zhang, Wei Han, Chung-Cheng Chiu, James Qin, Ruoming Pang, Yonghui Wu, "W2v-BERT: Combining Contrastive Learning and Masked Language Modeling for Self-Supervised Speech Pre-Training," arXiv preprint arXiv:2108.06209 [cs.LG], 2021, pp. 1-7.
William Chan, Daniel Park, Chris Lee, Yu Zhang, Quoc Le, Mohammad Norouzi, "SpeechStew: Simply Mix All Available Speech Recognition Data to Train One Large Neural Network," arXiv preprint arXiv:2104.02133 [cs.CL], 2021, pp. 1-5.
Sergey Zagoruyko, Nikos Komodakis, "Wide Residual Networks," arXiv preprint arXiv:1605.07146 [cs.CV], 2017, pp. 1-15.
Zihang Dai, Hanxiao Liu, Quoc V. Le, Mingxing Tan, "CoAtNet: Marrying Convolution and Attention for All Data Sizes," arXiv preprint arXiv:2106.04803 [cs.CV], 2021, pp. 1-18.
Xiaohua Zhai, Alexander Kolesnikov, Neil Houlsby, Lucas Beyer, "Scaling Vision Transformers," arXiv preprint arXiv:2106.04560 [cs.CV], 2021, pp. 1-31.
Alexander Sergeev, Mike Del Balso, "Horovod: fast and easy distributed deep learning in TensorFlow," arXiv preprint arXiv:1802.05799 [cs.LG], 2018, pp. 1-10.
Yimin Jiang, et al., "A Unified Architecture for Accelerating Distributed DNN Training in Heterogeneous GPU/CPU Clusters," in USENIX OSDI, 2020, pp. 1-18.
Noam Shazeer, Youlong Cheng, Niki Parmar, Dustin Tran, Ashish Vaswani, Penporn Koanantakool, Peter Hawkins, HyoukJoong Lee, Mingsheng Hong, Cliff Young, Ryan Sepassi, Blake Hechtman, "Mesh-TensorFlow: Deep Learning for Supercomputers." arXiv preprint arXiv:1811.02084 [cs.LG], 2018, pp. 1-16.
Zhihao Jia, Matei Zaharia, Alex Aiken,"Beyond Data and Model Parallelism for Deep Neural Networks.," Proceedings of the 2nd SysML Conference, 2019, pp. 1-13.
Dmitry Lepikhin, HyoukJoong Lee, Yuanzhong Xu, Dehao Chen, Orhan Firat, Yanping Huang, Maxim Krikun, Noam Shazeer, Zhifeng Chen, "GShard: Scaling Giant Models with Conditional Computation and Automatic Sharding," arXiv preprint arXiv:2006.16668 [cs.CL], 2020, pp. 1-35.
Deepak Narayanan, et al., "PipeDream: generalized pipeline parallelism for DNN training," SOSP '19: Proceedings of the 27th ACM Symposium on Operating Systems PrinciplesOctober 2019 pp. 1-15, https://doi.org/10.1145/3341301.3359646.
Maxim Naumov, et al., "Deep Learning Recommendation Model for Personalization and Recommendation Systems," arXiv preprint: https://arxiv.org/abs/1906.00091, 2019, pp. 1-10.
Deepak Narayanan, et al., "Efficient Large-Scale Language Model Training on GPU Clusters Using Megatron-LM," arXiv preprint: arXiv:2104.04473 [cs.CL], 2021, pp. 1-13.
ArXiv:2104.04473 [cs.CL], "ZeRO: Memory Optimizations Toward Training Trillion Parameter Models," arXiv preprint: arXiv:1910.02054 [cs.LG], 2019, pp. 1-24.
Liang Luo, Peter West, Arvind Krishnamurthy, Luis Ceze, Jacob Nelson, "Plink: Discovering And Exploiting Datacenter Network Locality For Efficient Cloud-Based Distributed Training," Proceedings of the 3rd MLSys Conference, Austin, TX, USA, 2020. Copyright 2020 by the author(s), pp. 1-16.
Liang Luo, Jacob Nelson, Arvind Krishnamurthy, Luis Ceze, "Cloud Collectives: Towards Cloud-aware Collectives forML Workloads with Rank Reordering," arXiv preprint: arXiv:2105.14088 [cs.DC], 2021, pp. 1-6.
Jie Ren, et al., "ZeRO-Offload: Democratizing Billion-Scale Model Training," in the Proceedings of the 2021 USENIX Annual Technical Conference, USENIX Annual Technical Conference, pp. 551-564, 2021.
Samyam Rajbhandari, Olatunji Ruwase, Jeff Rasley, Shaden Smith, Yuxiong He, "ZeRO-Infinity: Breaking the GPU Memory Wall for Extreme Scale Deep Learning," arXiv preprint: arXiv:2104.07857 [cs.DC], 2021, pp. 1-14.

Ernie Chan, Marcel Heimlich, Avi Purkayastha, Robert van de Geijn, "Collective communication: theory, practice, and experience," Concurrency and Computation: Practice and Experience, Concurrency Computat.: Pract. Exper. 2007, John Wiley & Son Ltd., 19: pp. 1749-1783.
Priya Goyal, Piotr Dollár, Ross Girshick, Pieter Noordhuis, Lukasz Wesolowski, Aapo Kyrola, Andrew Tulloch, Yangqing Jia, Kaiming He, "Accurate, Large Minibatch SGD: Training ImageNet in 1 Hour," arXiv preprint: arXiv:1706.02677 [cs.CV], version 2 2018, pp. 1-12.
Conglong Li, Ammar Ahmad Awan, Hanlin Tang, Samyam Rajbhandari, Yuxiong He, "1-bit LAMB: Communication Efficient Large-Scale Large-Batch Training with LAMB's Convergence Speed", arXiv preprint: arXiv:2104.06069 [cs.LG], 2021, pp. 1-23.
Yang You, Jing Li, Sashank Reddi, Jonathan Hseu, Sanjiv Kumar, Srinadh Bhojanapalli, Xiaodan Song, James Demmel, Kurt Keutzer, Cho-Jui Hsieh, "Large Batch Optimization for Deep Learning: Training BERT in 76 minutes," arXiv preprint: arXiv:1904.00962 [cs.LG], 2019, pp. 1-37.
Yang You, et al., "ImageNet Training in Minutes," ICPP 2018: Proceedings of the 47th International Conference on Parallel Processing, Aug. 2018 Article No. 1, pp. 1-11, arXiv preprint: arXiv:1709.05011v10.
Shuai Zheng, Haibin Lin, Sheng Zha, Mu Li, "Accelerated Large Batch Optimization of BERT Pretraining in 54 minutes," arXiv preprint: arXiv:2006.13484 [cs.LG], 2020 pp. 1-8.
Yinhan Liu, Myle Ott, Naman Goyal, Jingfei Du, Mandar Joshi, Danqi Chen, Omer Levy, Mike Lewis, Luke Zettlemoyer, Veselin Stoyanov, "RoBERTa: A Robustly Optimized BERT Pretraining Approach," arXiv preprint: arXiv:1907.11692 [cs.CL], 2019 pp. 1-13.
Alec Radford, Jeffrey Wu, Rewon Child, David Luan, Dario Amodei, Ilya Sutskever, "Language Models are Unsupervised Multitask Learners," OpenAI blog, 2019, pp. 1-24.
Azalia Mirhoseini, Hieu Pham, Quoc V. Le, Benoit Steiner, Rasmus Larsen, Yuefeng Zhou, Naveen Kumar, Mohammad Norouzi, Samy Bengio, Jeff Dean, "Device Placement Optimization with Reinforcement Learning," Proceedings of the 34th International Conference on Machine Learning, PMLR 70: pp. 2430-2439, 2017, 2017.
Zhihao Jia, Sina Lin, Charles R. Qi, Alex Aiken, "Exploring Hidden Dimensions in Parallelizing Convolutional Neural Networks," Proceedings of the 35 th International Conference on Machine Learning, Stockholm, Sweden, PMLR 80, 2018. Copyright 2018 by the author(s), pp. 1-10.
Yanping Huang, Youlong Cheng, Ankur Bapna, Orhan Firat, Dehao Chen, Mia Chen, HyoukJoong Lee, Jiquan Ngiam, Quoc V. Le, Yonghui Wu, zhifeng Chen, "GPipe: Efficient Training of Giant Neural Networks using Pipeline Parallelism," Part of Advances in Neural Information Processing Systems 32 (NeurIPS 2019), pp. 1-.
Shiqing Fan, et al., "DAPPLE: a pipelined data parallel approach for training large models," PPoPP '21: Proceedings of the 26th ACM SIGPLAN Symposium on Principles and Practice of Parallel Programming, Feb. 2021 pp. 431-445, https://doi.org/10.1145/3437801.3441593.
Yanghua Peng, et al., "A generic communication scheduler for distributed DNN training acceleration," SOSP '19: Proceedings of the 27th ACM Symposium on Operating Systems Principles, Oct. 2019, pp. 16-29, https://doi.org/10.1145/3341301.3359642.
Anand Jayarajan, Jinliang Wei, Garth Gibson, Alexandra Fedorova, Gennady Pekhimenko, "Priority-based Parameter Propagation for Distributed DNN Training," In proceedings of the 2nd SysML Conference 2019, arXiv preprint: arXiv:1905.03960 [cs.DC], pp. 1-14.
Amedeo Sapio, Marco Canini, Chen-Yu Ho, Jacob Nelson, Panos Kalnis, Changhoon Kim, Arvind Krishnamurthy, Masoud Moshref, Dan R. K. Ports, PeterarXiv:1903.06701 [cs.DC] Richtarik, "Scaling Distributed Machine Learning with In-Network Aggregation," arXiv preprint: arXiv:1903.06701 [cs.DC], pp. 1-25, 2020.
ChonLam Lao, et al., "ATP: In-network Aggregation for Multi-tenant Learning," in the Proceedings of the 18th USENIX Symposium on Networked Systems Design and Implementation, Apr. 12-14, 2021, pp. 741-761.

(56) References Cited

OTHER PUBLICATIONS

Frank Seide, Hao Fu1, Jasha Droppo, Gang Li, and Dong Yu, "1-Bit Stochastic Gradient Descent and its Application to Data-Parallel Distributed Training of Speech DNNs," Interspeech 2014, ISCA, pp. 1058-1062.

Yujun Lin, Song Han, Huizi Mao, Yu Wang, William J. Dally, "Deep Gradient Compression: Reducing the Communication Bandwidth for Distributed Training," Published as a conference paper at ICLR 2018, arXiv preprint: arXiv:1712.01887v3 [cs.CV], 2020, pp. 1-14.

Guanhua Wang, Shivaram Venkataraman, Amar Phanishayee, Nikhil Devanur, Jorgen Thelin, Ion Stoica, "Blink: Fast and Generic Collectives for Distributed ML," Part of Proceedings of Machine Learning and Systems 2 (MLSys 2020), arXiv preprint: arXiv:1910.04940v1, pp. 1-17.

Minsik Cho, et al., "BlueConnect: Novel Hierarchical All-Reduce on Multi-tired Network for Deep Learning," 32nd Conference on Neural Information Processing Systems (NeurIPS 2018), Montreal, Canada, pp. 1-8.

Rangan Majumder, "DeepSpeed: Extreme-scale model training for everyone," Microsoft Research Blog, https://www.microsoft.com/en-us/research/blog/deepspeed-extreme-scale-model-training-for-everyone/, Sep. 10, 2020, pp. 1-2.

\* cited by examiner

Obtain, e.g., via programmatic interfaces of a machine learning service (MLS), an indication of a resource set (RS) comprising training servers (TSs) (such as servers at a provider network), each with some number of training computing devices (TCDs such as GPUs/accelerators), to be used collectively to train an ML model such as a DNN; the network bandwidth and latencies of paths connecting different pairs of TCDs may differ, e.g., depending on whether both TCDs of a pair are within the same server, at different servers within a rack, or on different racks   1001

↓

Based on factors such as the size of the model's training state information (MTSI, which may be provided to the MLS or estimated/computed at the MLS), the number of TCDs of RS, the memory sizes of the TCDs, client preferences, etc., subdivide/arrange RS into P partition groups (PGs), such that a replica of the entire MTSI can fit within the memories of the TCDs of any given PG; assign each TCD to a respective replication group (RG), such that all TCDs within a given RG store a replica of the same subset of MTSI; each TCD may be assigned a respective cluster index/rank (CR), partition rank (PR) and server rank (SR); all the TCDs within an RG have the same PR   1004

↓

Set up inter-TS communication channels (e.g. k channels between each pair of TSs, where k is the number of TCDs per TS) and intra-TS communication channel(s) to be used for collective communication operations (such as all-gather, reduce-scatter, all-reduce etc.) during various stages of the training of the model   1007

↓

Perform, at each server, a set of batch training iterations of the model (e.g., sub-divided into micro-batches with intra-PG gradient synchronization per micro-batch, followed by intra-RG gradient synchronization at the accumulation boundaries or batch boundaries), a given iteration can include forward/backward parameter computations, during which a hierarchical communication strategy is used to transfer model state information such as parameter tensors/vectors within a PG (e.g., including inter-TS all-gather operations of MTSI chunks using inter-TS channels, reordering of the chunks, and intra-TS all-gather operations)   1010

↓

Store trained version of model after training is complete   1013

↓

Generate inferences using trained version of model, and provide indications of the inferences via programmatic interfaces   1016

FIG. 10

DISTRIBUTED TRAINING OF MACHINE LEARNING MODELS

BACKGROUND

This application claims benefit of priority to U.S. Provisional Application No. 63/303,379 filed Jan. 26, 2022, titled "Distributed Training of Machine Learning Models," which is hereby incorporated by reference herein in its entirety.

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data, and improved access to increasingly sophisticated machine learning models that can analyze this data. Some machine learning models may have very large training data sets and millions or even billions of parameters. Storing and processing of model state information during training of such large-scale models may be beyond that the capacity of single computing devices.

BRIEF DESCRIPTION OF DRAWINGS

FIG. 10 is a flow diagram illustrating aspects of operations which may be performed to train machine learning models using a distributed collection of resources, according to at least some embodiments.

Figure 1:
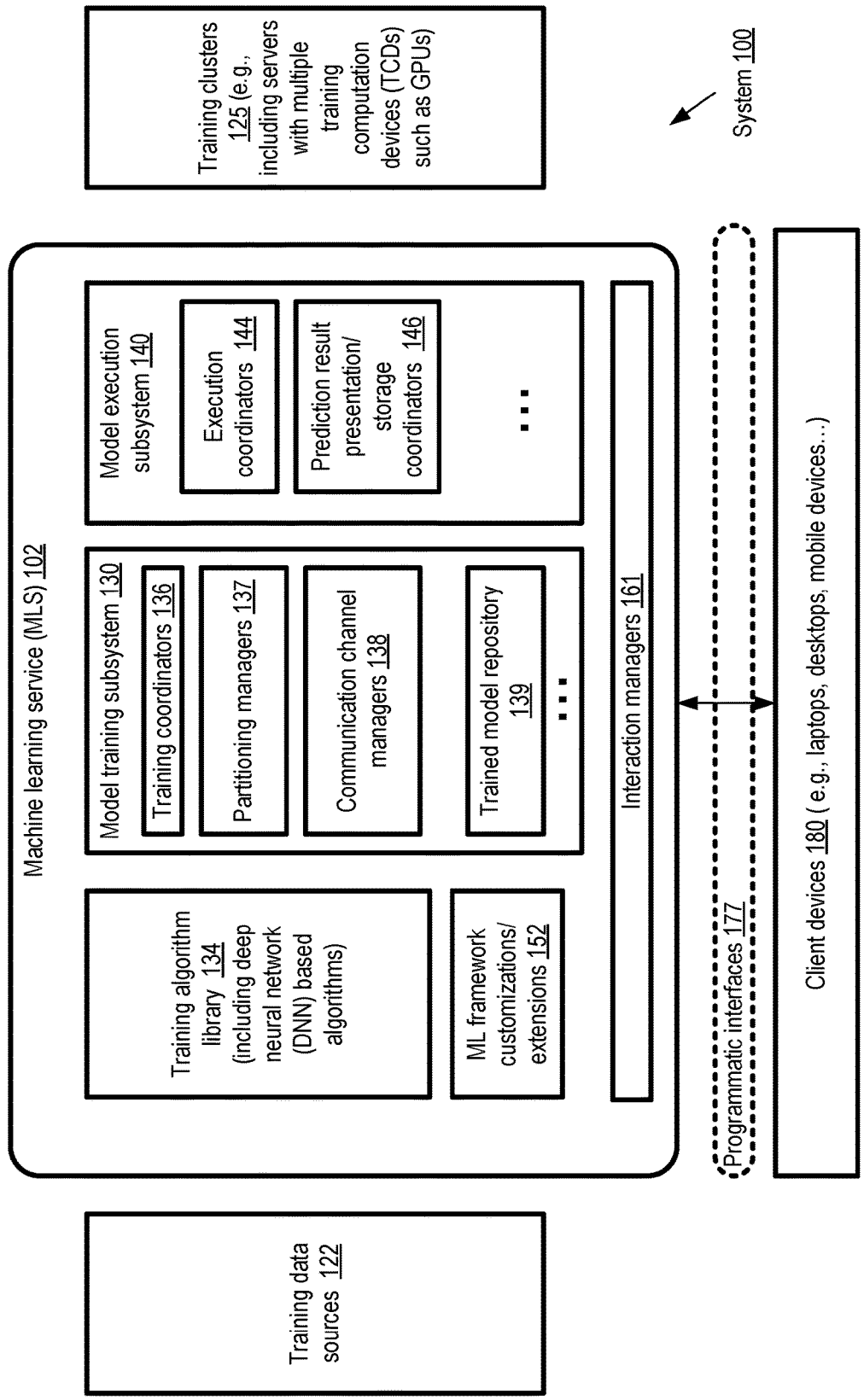
FIG. 1 illustrates an example system environment in which distributed training of machine learning models with large amounts of state information may be implemented efficiently using a combination of techniques that take network heterogeneity into account, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for efficient training of large machine learning models (for example, models with millions or billions of parameters) using a collection of computing devices which may be distributed such that the network pathways or channels available between different pairs of the computing devices may differ substantially in their bandwidth and latency. One example of such a computing environment is a provider network or public cloud computing environment which provides its users access to servers equipped with multiple GPUs (graphics processing units) per server. GPUs have been found to be effective for performing many of the kinds of computations needed for training deep learning models and the like, and are thus often chosen as training computing devices (TCDs). In scenarios in which a model's training state information (MTSI) (such as model parameters, gradients and optimizer states) is too large to be accommodated at a single GPU, the state information (and associated computations) may have to be distributed across several GPUs. However, in many computing environments such as provider networks, the bandwidth available for communications between various GPUs of a given server may often be much higher than the bandwidth available between GPUs at different servers within the same rack at a provider network data center, and the bandwidth available between GPUs at servers of different racks may be lower still. Similarly, message latencies between pairs of GPUs may be much lower for intra-server messages than for inter-server messages, and so on.

If such differences in communication costs between GPUs are not taken into account during training, this can result in very high networking costs for some of the collective communication operations typically performed during distributed model training (such as various types of redistribution and consolidation operations for training state information), which in turn leads to poor training scalability as the model size increases. In effect, the communication required for the training may become the bottleneck, depending on factors such as the number of GPUs/TCDs participating in collective communications at various stages of training and the relative networking bandwidths available among the GPUs/TCDs. Some state of the art distributed training techniques, which treat all available TCDs equivalently, and may include stages of collective communications between all the TCDs regardless of differences in networking capacity, may not scale well in heterogeneous computing environments such as provider networks.

The size of the MTSI of a model may be referred to simply as "model size" in various embodiments. A "large model" is thus a model whose MTSI occupies a large amount of memory or storage, such as several tens of gigabytes or hundreds of gigabytes (GB). Several of the techniques proposed herein are based on the following core design principle to achieve much higher efficiency and scalability for training large models given a cluster or resource set of TCDs spread among several training servers (TSs) with heterogenous networking capabilities of the kind discussed above: to reduce the number of communication participants (referred to as "communication scale") as far as possible during as many stages of model training as possible. Communication participants may for example comprise one or more training worker threads associated with or running at each TCD in some embodiments, with each worker responsible for performing a respective subset of training computations. With this design principle in mind, a number of different strategies/algorithms may be employed in different embodiments, including scale-aware model partitioning, a hierarchical communication strategy, and multi-level gradient synchronization (also referred to as a 2-hop gradient synchronization). These strategies may be collectively termed communication scale reduction (CSR) techniques or strategies herein. To explain the concepts involved, a deep neural network (DNN) based model is used as the primary example of the kind of model that may be trained in a distributed manner.

In scale-aware model partitioning, the available TCDs of the cluster may be divided or distributed into partition groups (PG) in various embodiments. Each PG may hold a complete copy or replica of the model state. Within each PG, model training state information (MTSI) may be partitioned, such that different TCDs maintain respective subsets of the MTSI. The system typically attempts to use as few training servers as possible for each PG. For example, if the entire MTSI can fit within the available memories of 8 TCDs (assuming all 8 TCDs are identical in their performance capacities), and the resource set identified for the model training comprises 4 training servers with 4 TCDs each, a preferred configuration for a PG would include the 4 TCDs at each of two training servers (rather than, for example, using 2 TCDs at each of the 4 training servers). Many frequent parameter gathering operations may be performed at the scale of a PG, rather than at the scale of the cluster as a whole, thus reducing inter-server communication penalties substantially. During training, the different PGs may operate on respective subsets or subsamples of the training data set in parallel in at least some implementations, helping to speed up the overall training process. Thus, generally speaking, the mapping of TCDs to PGs spread among as few training servers per PG as possible helps to reduce potentially expensive inter-server communications, and configuring as many such PGs as is possible given the total size of the resource set helps to reduce the overall training time and helps to utilize the resource set as highly as possible. Individual TCDs within different PG may also be assigned or designated as members of a replication group (RG), such that each TCD within a given replication group is responsible for maintaining the same subset of the MTSI.

A hierarchical communication strategy utilized in various embodiments may enable parallelization of multiple inter-server collective communication operations, and reduce the scale of at least some collective communication operations (such as all-gather operations). As a result of the hierarchical communication strategy, the aggregate traffic between servers may be reduced.

In accordance with a multi-level or 2-hop gradient synchronization methodology, gradients may be synchronized only within a PG until a gradient accumulation boundary is reached in some embodiments. At the gradient accumulation boundary, gradients may be synchronized across PGs (e.g., among TCDs of a given RG). As a result, the cost of gradient synchronization is also reduced. In addition to utilizing strategies such as scale-aware model partitioning, hierarchical communication and 2-hop gradient synchronization, a number of additional optimizations may be implemented in various embodiments, including the use of fine-grained synchronization, coalesced communication application programming interfaces (APIs), and memory defragmentation, that also help improve model training performance. Not all the CSR techniques and optimizations may be utilized in at least some embodiments, e.g., based on factors such as the kind and size of the model being trained, the resource set available for training the model, and so on. For example, in some embodiments, hierarchical communication may be employed but 2-hop gradient synchronization may not be employed for some models; in at least one embodiment, 2-hop gradient synchronization may be used for a model, but hierarchical communication may not be used. A wide variety of models may be trained efficiently using the proposed approach, including natural language processing (NLP) models for tasks such as token prediction, next sentence prediction and the like, image or video processing models, graph-based models for recommendation generation, fraud detection, or search, and so on.

In measurements obtained from clusters of provider network servers which have similar network heterogeneity properties to those indicated above, the proposed techniques have been shown to provide performance and scalability superior when compared to several state of the art approaches, while maintaining or improving the quality of the inferences/predictions generated by the trained model. For example, substantially higher throughputs measured in floating point operations per second during training, substantially shorter training completion times, and near-linear scaling efficiency with model size have been measured.

In some embodiments, the optimized distributed training techniques introduced herein may be implemented by or at a service (such as a machine learning service (MLS) or a model training service) of a provider network. Several different services of the provider network may be utilized together for training and executing large machine learning models in at least one embodiment: for example, a virtualized computing service or parallel computing service may provide access to clusters of TCDs, a storage service may be used to store very large training data sets, and an MLS may coordinate the distributed training process.

It is noted that while GPUs are discussed as examples of common training computing devices herein, the distributed training techniques introduced may be applied with equal success in computing environments which utilize other types of training computing devices (TCDs) or training accelerators such as special-purpose machine learning chipsets, high-performance CPUs (central processing units) and the like. The applicability of the techniques is not limited to any particular hardware architecture or virtualization architecture. In addition, while DNN based models are provided herein as the primary examples of models whose training is optimized as indicate above, the applicability of the techniques is not limited to any particular type of machine learning model. TCDs may also be referred to simply as training devices (TDs) in at least some embodiments. While a provider network or cloud computing environment is presented herein as an example of a heterogeneous (at least from the perspective of networking) computing environment at which the CSR techniques may be implemented beneficially, the CSR techniques may be applied with equal success at other types of heterogeneous environments as well, such as data centers external to the provider network.

As one skilled in the art will appreciate in light of this disclosure, certain embodiments may be capable of achieving various advantages, including some or all of the following: (a) reducing the overall amount of time and computing resources used to train very large machine learning models, e.g. models with millions or billions of parameters, using public cloud-based resources or other heterogeneous computing environments and/or (b) improving the quality of the machine learning inferences generated for applications such as speech recognition, natural language processing, image/video processing and the like, by enabling more detailed (and hence larger) models to be trained and deployed.

According to at least some embodiments, a system may comprise one or more computing devices. The computing devices may include instructions that when executed on or across the one or more computing devices identify (e.g., in response to a programmatic request from a client of a machine learning service) a resource set or cluster for training a machine learning model, such as a deep neural network (DNN)-based model. The resource set may comprise a plurality of servers (which may also be referred to as nodes of the cluster), e.g., virtualized or un-virtualized servers implemented at a computing service, with individual ones of the servers comprising a plurality of training computing devices (TCDs) such as GPUs. As such, the operations or computations of the training process may be distributed among multiple resources. The available communication bandwidth between a pair of TCDs of a given server may differ from the available communication bandwidth between TCDs at different servers in at least some embodiments. In one embodiment, even within a server, different groups of TCDs may be connected via interconnects with different networking performance capabilities.

The resource set may be subdivided or organized into a plurality of partition groups (PGs) in various embodiments, such that the aggregate memory capacity of the TCDs of a given PG is sufficient at least to store a respective replica of the model's training state information (MTSI). Individual ones of the TCDs within a PG may also be assigned to a respective replication group (RG) in some embodiments, with individual members of an RG all storing a respective subset of the MTSI. In at least some embodiments, as few servers as possible may be used for a given PG (while still satisfying the constraint that a replica of the entire MTSI fits within the PG), or more generally, an attempt may be made to keep the number of servers within a PG as low as feasible. As a result, communications within the TCDs of a PG (which may include fast intra-server communication paths) may on average be more efficient/faster than communications among pairs of TCDs across PG boundaries in at least some embodiments. Individual ones of the PGs may utilize a respective subset or subsample of the training data set of the model during the distributed training in some embodiments.

In preparation for the distributed training of the model, a number of different classes of communication channels may be established in various embodiments. For example, in one embodiment, if each server of the resource set comprises k TCDs (such as k GPUs), k channels for communication may be established for inter-server communication between TCDs, while one or more channels may be established at each server for intra-server TCD communications. The manner in which channels are created may be implementation-dependent—for example, in some implementations, channels may be created by invoking functions or application programming interfaces of an operating system library or networking library, in another implementation environment variables may be used to control the number of channels of various types, and so on. In some implementations one or more types of channels may be referred to as communicators, connections, or sockets. Any of a variety of different communication protocols may be used for the channels in different implementations, e.g., including variants of Transmission Control Protocol/Internet Protocol (TCP/IP), custom protocols implemented by server vendors or TCD vendors, and the like.

In at least some embodiments, the distributed training of the model may be performed using the plurality of PGs and may comprise a number of iterations. A given iteration may for example comprise processing a respective sample or subset of a training data set in one embodiment. The iterations may comprise at least four broad types of operations or phases in some embodiments in which a DNN is being trained: forward computations/propagations through the layers of the DNN, backward computations/propagations, gradient synchronization, and parameter updating. The gradient synchronization may be performed before updating the model parameters to ensure that training threads or workers operating in parallel at the different TCDs of the resource set are able to use the same set of parameters to evaluate the next set of training examples. The model's training state information may include, for example, model parameters, gradients (e.g., from backward propagations or computations), and optimizer states in at least some embodiments. Examples of optimizer states may include, among others, moving averages of gradients or squared gradients.

The distributed training of the model may comprise a multi-stage gathering or acquisition of a portion of the model's training state information (such as a tensor or vector of a subset of model parameters) at TCDs of a particular PG in some embodiments, e.g., during a forward or backward computation phase of the training. One or more "all-gather" collective communication operations may be used in some embodiments. A first stage of the multi-stage gathering may comprise utilizing an inter-server communication channel to transfer a set of chunks (sub-units) of the model's training state information. Multiple such inter-server communications may be executed in parallel in some embodiments between various pairs of TCDs, e.g., concurrently using up to the k inter-server channels discussed above. A second stage of the multi-stage gathering may comprise rearranging the set of chunks within a memory of a training computing device to ensure that all the chunks are (eventually, after they are gathered in a subsequent stage) ordered correctly, and a third stage may comprises utilizing an intra-server communication channel to transfer at least a subset of the set of chunks between TCDs to complete the acquisition of all the chunks needed for the particular backward/forward computation. In the third stage, inter-server communication channels may not be used in various embodiments, as all the communication of the third stage may be implemented using only intra-server communication channels.

The distributed training of the model may comprise performing multi-level gradient synchronization in some embodiments. Using larger batches of training input per training iteration has the benefits of decreasing gradient variance and reducing the total training time (e.g., because fewer iterations are needed for a given amount of training data), so large batches may often be used for training large DNNs. However, due for example to memory constraints at the TCDs, gradients may have to be accumulated (e.g., into a shared memory buffer) after each of several micro-batches per large batch. A first level of the multi-level gradient synchronization may comprise synchronizing gradients among training computing devices within a partition group without sending messages across partition group boundaries, and a second level of the multi-level gradient synchronization comprises synchronizing gradients among training devices of a replication group (which can involve sending messages across partition group boundaries). The first level may utilize intra-server and/or inter-server communications as needed. The second level may involve inter-partition communications in various embodiments, which may in turn in some configurations require inter-server communications. The first level of multi-level gradient synchronization may, for example, be performed after individual micro-batches of a large batch of training examples have been processed, while the second level may be performed at a gradient accumulation boundary such as the completion of processing of the large batch. Thus, if the number of micro-batches per batch is increased, a larger proportion of gradient synchronizations may be performed within a PG, and synchronizations across multiple PGs may be less frequent. In at least some embodiments, as mentioned above, an attempt may be made to use as few servers as possible for a given PG (while still satisfying the constraint that a replica of the entire MTSI fits within the PG), so communications within a PG may typically be more efficient/faster than communications across PG boundaries.

In at least some embodiments, as mentioned above, the distributed training of large models may be orchestrated or coordinated at a machine learning service (MLS) of a provider network or cloud computing environment. In some embodiments, a client of an MLS may provide information about (such as a description of, or the actual program code of) the model to be trained, and this information may be used by the MLS to estimate or determine the size of the model's training state information (MTSI). In one embodiment, a client may provide an estimate of the MTSI as part of the model information provided to the MLS. The MTSI size may then be used to perform scale-aware model partitioning given the client's preferred resource set. Information about the resource set (as well as the training data set) may also be indicated to the MLS via a programmatic interface by the client in at least some embodiments. The resource set may include one or more types of compute instances of a virtualized computing service (VCS) of the provider network in various embodiments. In one embodiment, a client of an MLS may provide a descriptor of the model (or an estimate of the MTSI size) and/or a target training completion time and request a recommended cluster or resource set configuration from the MLS. The MLS may be aware of the types of available resources (e.g., supported families of compute instances or virtual machines) at computing services of the provider network, and the kinds of computations and collective communication patterns which may be required for training the specified model, and may use this information to recommend one or more resource set configurations to the client. If desired, the client may acquire or obtain access to a recommended resource set from a computing service, and enable the MLS to start using the recommended resource set to train the model. Clients may also use MLS programmatic interfaces to indicate training data sets and hyperparameters for their models, such as a learning algorithm to be used for the model, a loss function, a number of layers of a neural network used for the model, the sizes of batches and/or micro-batches to the processed during the training, algorithms for selecting micro-batches, and so on.

An MLS may collect metrics of various kinds from the resource set during the distributed training of the model, and provide them to a client via programmatic interfaces in various embodiments. Such metrics may include, for example, the utilizations of the various TCDs and network channels/paths between TCDs, the amount of data transferred across different communication channels during the training, and so on. In some embodiments, based on metrics collected during the training, the MLS may generate a recommendation for a change to the resource set—e.g., a recommendation to use GPUS with more memory, or different types of compute instances—and provide the recommendation to a client. The client may then decide to change the resource set based on the recommendation, and in some cases pause and/or restart the training so that the modified resource set can be used.

In one embodiment, the MLS may pre-allocate memory at various TCDs of the resource set prior to initializing the distributed training of the model. For example, large contiguous memory buffers may be pre-allocated for holding partitioned parameters, partitioned gradients and the like, thus avoiding potential out-of-memory errors due to memory fragmentation which may occur if attempts to acquire large amounts of contiguous memory are made after the training has started. A set of small temporary buffers may also be acquired for the training in advance in some embodiments, e.g., for local computations. In some embodiments, grouping primitives of a networking library may be utilized by the MLS to launch multiple communication operations in parallel between TCDs, instead of initiating individual communication operations one at a time.

As mentioned above, in at least some embodiments an MLS which implements the efficient distributed training techniques introduced above may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or network-accessible services, which may include, in addition to an MLS, a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores) and/or virtualized accelerator/GPUs, memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, accelerator, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. As mentioned above, the resource sets used by an MLS for training models may comprise compute instances in at least some embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. In some embodiments, software containers may be used to implement at least some distributed training operations of the kind introduced above. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. Various services of the cloud provider, such as an MLS, may include their own control plane servers and data plane resources.

FIG. 1 illustrates an example system environment in which distributed training of machine learning models with large amounts of state information may be implemented efficiently using a combination of techniques that take network heterogeneity into account, according to at least some embodiments. As shown, system 100 may include resources and artifacts of a machine learning service (MLS) 102, including training algorithm library 134, model training subsystem 130, model execution subsystem 140 and interaction managers 161 in the depicted embodiment, as well as training data sources 122 and training clusters 125. The training clusters 125 may include physical or virtual servers with multiple training computation devices (TCDs) such as GPUs or other accelerators in the depicted embodiment. The network bandwidth available for communications between some pairs/groups of TCDs (such as a pair of TCDs that are incorporated within a single server) may differ from the network bandwidth available between other pairs/groups of TCDs (such as TCDs located on different servers. Similarly, network latencies may also differ for messages sent between different pairs or groups of TCDs within a cluster. In addition to multiple TCDs that are well-suited for performing many types of model training computations in parallel, servers of the training clusters may include CPUs in at least some embodiments.

The MLS 102 may implement a set of programmatic interfaces 177, such as web-based consoles, command-line tools, application programming interfaces (APIs), graphical user interfaces and the like. Clients or users of the MLS 102 may submit various types of requests or messages via the programmatic interfaces 177 from a variety of client devices 180 (such as laptops, desktops, mobile computing devices and the like), and receive corresponding responses via the interfaces in the depicted embodiment. The requests may be processed initially by interaction managers 161, which may in turn transmit internal versions of the requests to other components of the MLS such as the model training subsystem 130 or the model execution subsystem 140. Responses to the clients' messages may be generated at the other components and sent to the client devices via the interaction managers in at least some embodiments.

An MLS client may use programmatic interfaces 177 to submit an indication of a resource set to be used for training a machine learning model (such as a DNN model) in the depicted embodiment. The resource set may comprise at least some servers of a training cluster 125, which may have been acquired by the client earlier. In some embodiments, the client may provide a descriptor of the model which is to be trained, and the MLS may analyze the model descriptor (which may include the code of the model and/or configuration settings of the model) and identify or recommend a resource set for training the model; the client may then acquire the recommended resource set from a provider network or some other source if desired. In at least one embodiment, the resource set or cluster may comprise compute instances of a virtualized computing service (VCS), and the client may specify co-location preferences when requesting the compute instances for the cluster. For example, the client may request compute instances that are hosted within a single rack, or compute instances that are hosted on a single server are preferred to compute instances that are distributed across racks or across servers. In at least one embodiment, a training cluster for a model may comprise resources located at a premise external to a provider network at which the MLS is implemented—as such, the MLS may coordinate training of a model using the CSR techniques introduced above, using a resource set at a premise external to the data centers of the provider network at which the MLS itself is implemented. In some cases, an MLS implemented at one provider network may use TCDs at another provider network to train a model.

The MLS client may also specify a training data source 122 from which training examples can be obtained and used to train model using a training algorithm from algorithm library 134 in the depicted embodiment. The training algorithm may, for example, comprise a DNN based algorithm for which training can be implemented in batches in some embodiments. A DNN may comprise numerous hidden layers, with numerous artificial neurons per layer. The model training state information (MTSI) of a given model, which may include its parameters (which may number in the billions), gradients, and optimizer states, may be too large to fit into individual ones of the TCDs of the cluster or resource set identified for it. Note that the MLS may be used to train and execute models of many different types in various embodiments, not just DNNs, and the techniques described herein may represent a small subset of the MLS capabilities. In one embodiment, an MLS client may specify constraints for training the model, such as a total resource budget and/or a total time budget, and the MLS may use this information to select the training cluster to be used. Note that in embodiments in which the training clusters comprise virtual machines, the CPUs and/or the GPUs/accelerators may be accessed via virtualization interfaces.

Model training subsystem 130 may comprise one or more training coordinators 136, one or more partitioning managers 137, one or more communication channel managers 138, and a trained model repository 139 in the depicted embodiment, each of which may be implemented using some combination of hardware and software of one or more computing devices. Model execution subsystem 140 may include execution coordinators 144 and prediction result presentation/storage coordinators 146, each of which may also be implemented using some combination of hardware and software of one or more computing devices.

After information about a model to be trained, including its training data set and a resource set to be used for the training is obtained, in at least some embodiments, a training coordinator 136 may orchestrate the training of the model, using some combination of CSR techniques such as scale-aware model partitioning, a hierarchical communication strategy, and/or multi-level gradient synchronization of the kind described above. An estimate of the size of the MTSI may be provided by an MLS client via programmatic interfaces 177 in some embodiments; in other embodiments, the client may not specify the size of the MTSI, and a training coordinator may estimate the size based on a model descriptor provided by the client. In some embodiments, respective training worker threads (or sets of training worker threads) launched by a training coordinator may utilize respective TCDs of a cluster or resource group to implement the training algorithm at various stages of the training.

Prior to commencement of model training iterations, partitioning managers 137 may be responsible for subdividing the resource set for parallelizing training, e.g., by assigning TCDs of the training resource set or cluster to partition groups (PGs) and replication groups (RGs), e.g., based on factors such as the MTSI size, the resource set size, and the memory capacities of the TCDs in the depicted embodiment. The TCDs of a given partition group may be selected such that collectively a replica of the entire MTSI can be maintained within the partition group; the number of partition groups may be based on the number of TCDs of the resource set. A partitioning manager may attempt to organize the available servers and TCDs into partition groups so as to utilize as few distinct servers per PG as possible in some embodiments, given the estimated size of the MTSI and the memory sizes of individual TCDs. The specific subsets of the MTSI which are to be maintained at individual TCDs may also be assigned by a partitioning manager in some embodiments. Note that in some embodiments, some TCDs may differ in their memory capacities, and some servers may comprise different counts of TCDs than others; the partitioning manager may take such asymmetries into account in such embodiments when assigning TCDs to partition groups.

Channels for inter-server communication and intra-server communication of the resource set may be created by communication channel managers 138 in various embodiments. For example, if there are k TCDs per server, in one embodiment k channels may be set up for inter-server communications for respective pairs of servers of the resource set. The training data set may be divided into batches for parallel iterative training by the training coordinator 136 in some embodiments, and the sizes of the micro-batches after which the first level of gradient synchronization (gradient synchronization within a partition group) may be determined by the training coordinators.

The training of the model may include phases (such as backward and forward computation phases) in which portions of the MTSI such as parameter tensors or vectors have to be gathered and/or redistributed among a set of TCDs in various embodiments. A multi-stage gathering of a portion of the model's training state information at TCDs of a partition group may be implemented in some embodiments in accordance with the hierarchical communication strategy. An example of such a multi-stage gathering is provided in FIG. 6. The first stage of the multi-stage gathering may comprise utilizing an inter-server communication channel to transfer a set of chunks of the model's training state information among TCDs of a partition group. A second stage of the multi-stage gathering may comprise rearranging the set of chunks within a memory of a TCD, and a third stage of the multi-stage gathering may comprise utilizing an intra-server communication channel to transfer at least a subset of the set of chunks among TCDs. In accordance with the multi-level gradient synchronization methodology, after micro-batches (small subsets) of a batch of training data has been processed, gradients may be synchronized among TCDs of a partition group, without synchronizing the gradients across partition groups. At gradient accumulation boundaries (e.g., when all the micro-batches of a given batch have been processed), gradients may be synchronized among TCDs of a replication group (which may involve communication across partition groups). In at least some embodiments, a set of machine learning framework customizations/extensions 152 may be employed during distributed training of a model at the MLS, e.g., instead of using a baseline version of a framework such as PYTORCH or MXNet. Such extensions may include, for example, coalesced or batched communication APIs (e.g., all_gather_coalesced or reduce_scatter_coalesced) that avoid redundant buffer allocations and data copies of the corresponding baseline communication APIs (e.g., all_gather and reduce_scatter).

After the training iterations at all the partition groups of the resource set being employed for the model are completed (i.e., after the model's predictions reach a desired quality threshold, or after the resource or time budget set aside for the training is exhausted), a trained version of the model may be stored, e.g., at trained model repository 139 of the MLS. The model may then be executed as and when desired by the client on whose behalf the model was trained, with the execution being orchestrated by an execution coordinator 144 using one or more resources in the depicted embodiment. In some embodiments, a subset of the same resource set that was used for training may be used for executing the model; in other embodiments different resources may be used for execution. Inferences generated during the execution, such as input data classifications, predictions and the like, may be provided to the client via programmatic interfaces 177 by prediction result presentation/storage coordinators 146 in some embodiments. Metrics collected during the training and/or execution (such as measured utilizations of various TCDs and network paths etc.) may be provided to the client via programmatic interfaces in at least one embodiment upon request or automatically. Clients may specify various hyperparameters for the training of the model via interfaces 177 in some embodiments, such as the algorithm to be used for training, loss functions used during training, a number of layers of a neural network used for the model, preferred sizes of batches and micro-batches, etc.

Figure 2:
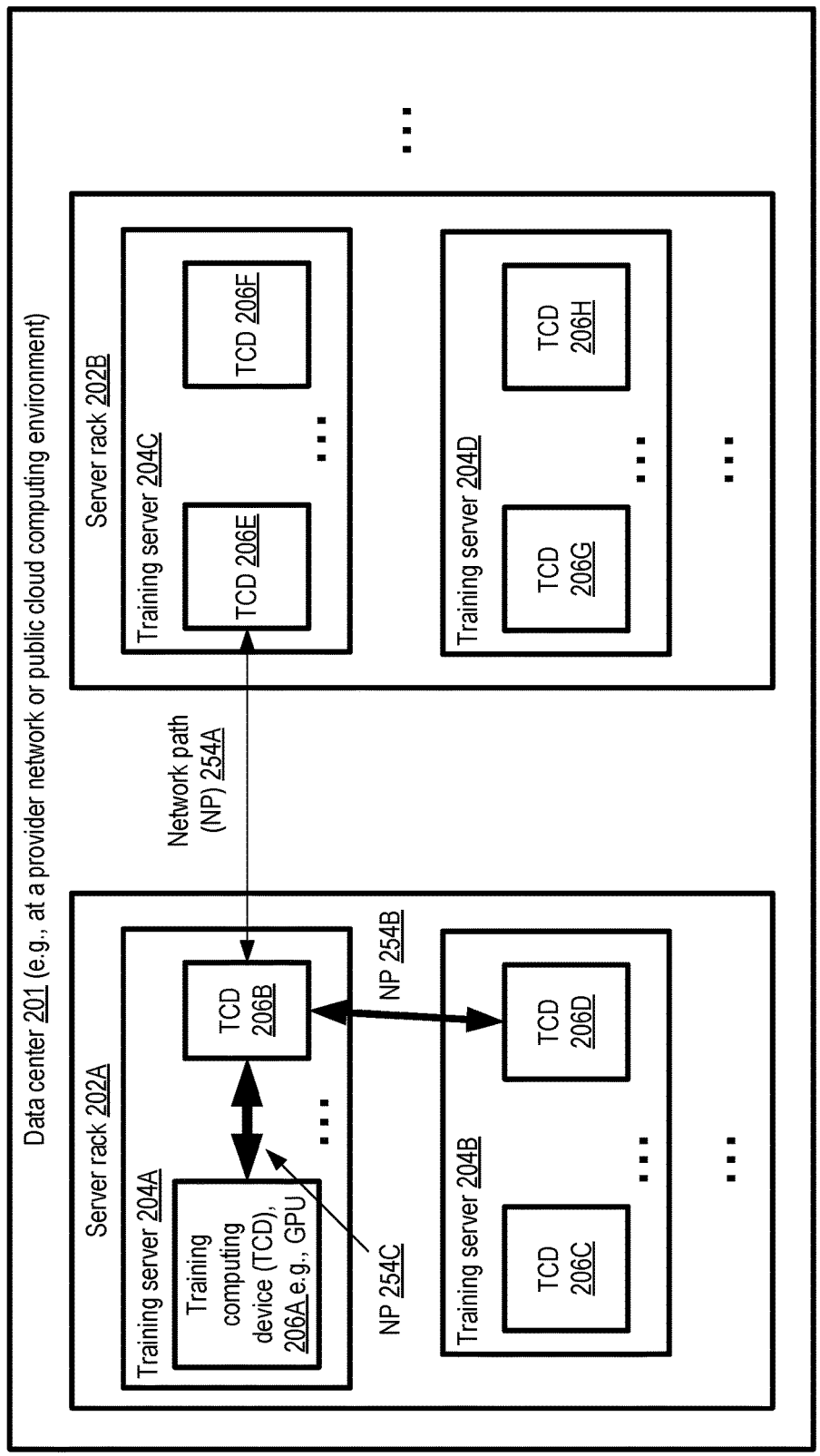
FIG. 2 illustrates examples of heterogeneous network paths available between training computing devices at a data center, according to at least some embodiments.

The communication scale-aware techniques introduced above enable efficient training of large models in environments in which the network links/paths/channels between some groups of TCDs have different performance capacities than the network links/paths/channels between other groups of TCDs. FIG. 2 illustrates examples of heterogeneous network paths available between training computing devices at a data center, according to at least some embodiments. In the depicted embodiment, a resource set used for scale-aware distributed training of a model may comprise training servers 204A, 204B, 204C and 204D located at a data center 201 (e.g., at a provider network or cloud computing environment).

Each of the training servers 204 may comprise at least two TCDs 206, such as GPUs or other training accelerators in the depicted embodiment. Thus, training server 204A comprises TCDs 206A and 206B, training server 204B comprises TCDs 206C and 206D, training server 204C comprises TCDs 206E and 206F, and training server 204D comprises TCDs 206G and 206H. Training servers 204A and 204B may be located within server rack 202A, while training servers 204C and 204D may be located within a different rack 202B in the example scenario presented in FIG. 2.

Programs (such as training worker threads) at respective pairs of TCDs 206 (or more generally, respective groups of TCDs) may be able to communicate with one another via several different types of network paths in the depicted embodiment. To use a give network path, a combination of hardware (e.g., an interconnect) and software (e.g., a networking protocol) may be employed in various embodiments. TCDs within a given server may communicate via network paths such as 254C, which support very high bandwidths and very low latencies. Intra-rack inter-server communication may be performed using network paths such as 254B, which may have lower bandwidth and higher latencies than intra-server network paths such as 254C, and may in some cases utilize special-purpose hardware interconnects. Network paths such as 254A which link servers/TCDs at different racks may support lower bandwidth and higher latencies than network paths 254C or 254B in some embodiments; depending on the computing environment (such as a virtualized computing service) different kinds of hardware links or interconnects may be available. The difference in bandwidths and/or latencies between the different kinds of network paths may be orders of magnitude in some cases. The latency of collective communication algorithms has been shown to have a positive correlation with the communication scale (the number of participants in the collective communication) and the startup time for transmission. As communication scale grows, the latency grows as well. As the size of a resource set or cluster used for training a model grows, in general larger messages may be needed to make better use of the available bandwidth; however, it may not always be possible to increase message sizes due to memory constraints of the TCDs. For these and other reasons, a partitioning scheme and hierarchical communication strategies may be employed in various embodiments to make more effective use of the available resources for training large models.

When organizing the TCDs of a resource group into partition groups and replication groups, an MLS may therefore attempt to co-locate as many TCDs of a partition group as possible. For example, preferably, a given training server may be utilized for an entire partition group. If such a single-TCD PG configuration is not possible given the MTSI size and the capacities of the TCDs, TCDs at servers within the same rack may be used for a partition group as opposed to using TCDs at different racks, and so on. Note that additional levels of networking heterogeneity may be encountered in some cases—e.g., racks within a given room or in a particular subset of a data center may have higher network bandwidth for inter-rack communication than racks in different rooms. In some cases, servers at different data centers may be included within a resource group. The MLS may obtain information about all the different types of network paths available within a resource group or cluster in various embodiments, and use this information to try to minimize communication costs during training as far as possible by configuring the TCDs into partition groups and replication groups appropriately.

Figure 3:
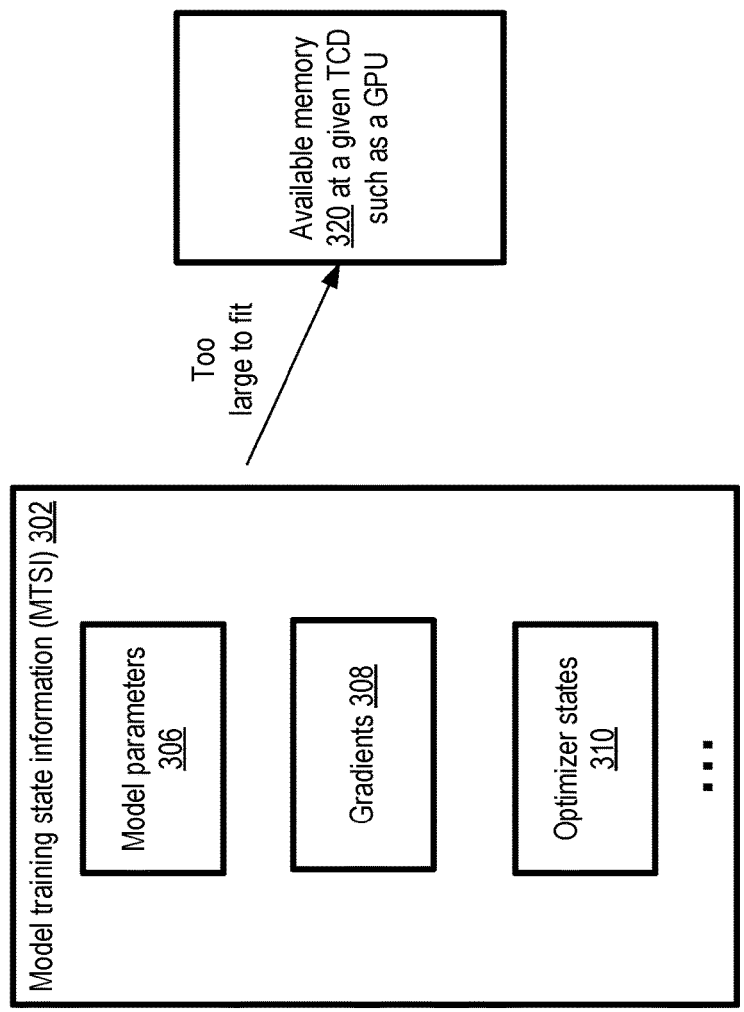
FIG. 3 illustrates examples of machine learning model training state information, according to at least some embodiments.

FIG. 3 illustrates examples of machine learning model training state information, according to at least some embodiments. As shown, the MTSI 302 for a given DNN based model may include model parameters 306, gradients 308 and optimizer states 310 in the depicted embodiment. For models that have millions or billions of parameters, the MTSI 302 may be too large to fit within the available memory 320 at a given TCD such as a GPU of the resource group. As a result, multiple TCDs may have to be used collectively to train a given large model. Given the differences in network path characteristics for inter-TCD communications illustrated in FIG. 2, communication scale-aware partitioning techniques, hierarchical communication strategies, and/or multi-level gradient synchronization techniques of the kind introduced above may be employed to make the most effective use of a distributed collection of TCDs in various embodiments. In some embodiments, MTSI may include other kinds of data than that shown in FIG. 3.

The following notation may be used herein to refer to various aspects of the distributed communication scale-aware training of a DNN-based model in which gradients are synchronized within a partition group after every micro-batch:

n: the number of TCDs in a cluster to be used for training k: number of TCDs per server or node of the cluster or resource set M: the size of the model or MTSI p: number of TCDs that can collectively be used to store a replica of the model Bg: the effective communication bandwidth among TCDs assigned to a partition group (bandwidth measured during or for a collective communication such as all-gather)

Figure 4:
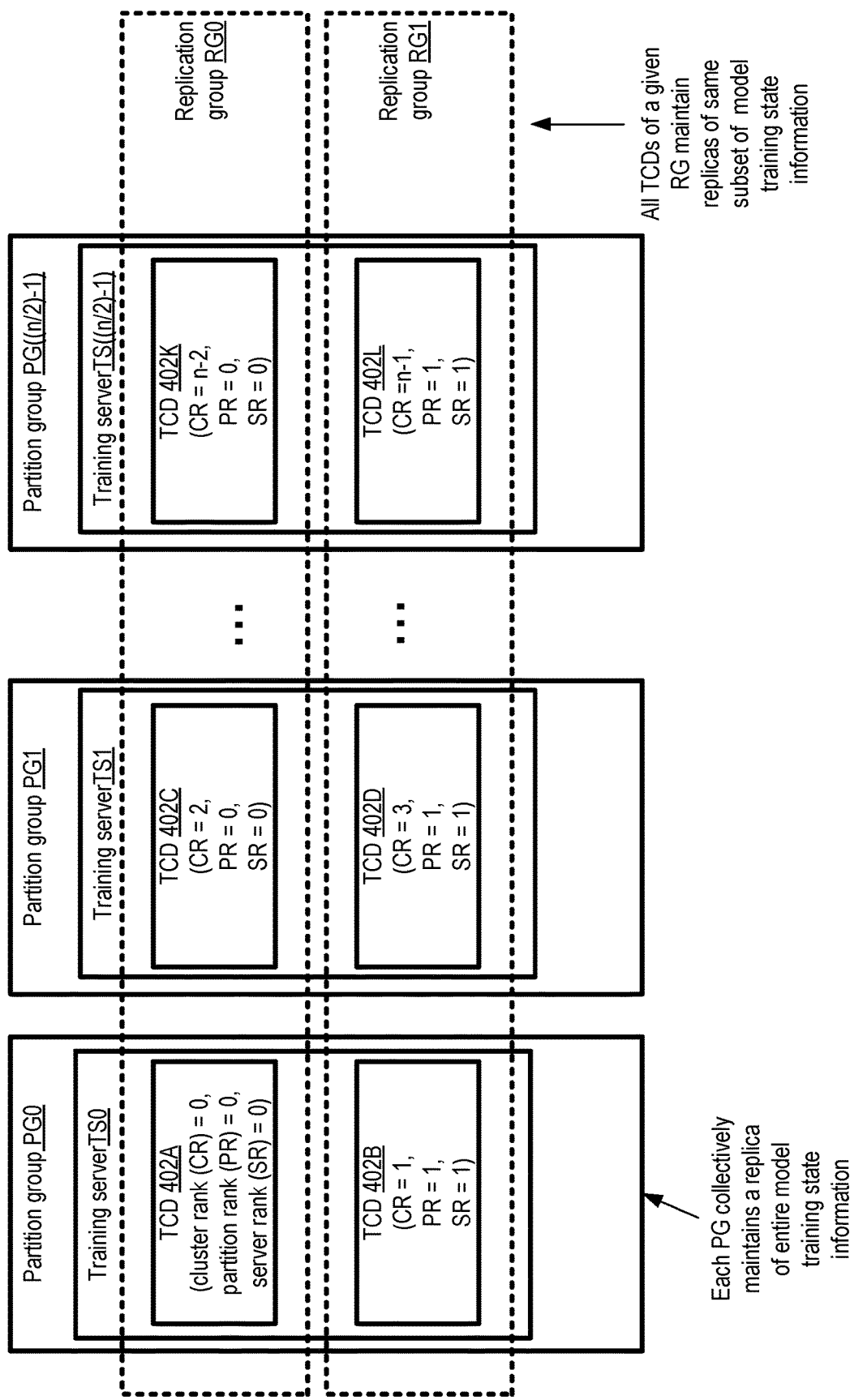
FIG. 4 illustrates an example arrangement of training computing devices into partition groups and replication groups, according to at least some embodiments.

C: time cost of training the model s: the number of micro-batches per batch of the training data FIG. 4 illustrates an example arrangement of training computing devices into partition groups and replication groups, according to at least some embodiments. Such an arrangement may be orchestrated, for example, by a partitioning manager of the kind shown in FIG. 1 in response to obtaining information about the size of the MTSI of the model to be trained, configurations (including memory capacity) of the available servers and TCDs of a resource group identified for the training, communication costs for paths of different types (e.g., intra-server, inter-server, inter-rack, etc.) and/or preferences indicated by the MLS client on whose behalf the model is to be trained. To simplify the presentation, the resource group illustrated in FIG. 4 is assumed to be uniform: that is, all TCDs of the resource group are assumed to be identical in their memory size and other features, and all servers are assumed to be identical to one another in their capabilities. Each training server has two TCDs: training server TS0 has TCDs 402A and 402B, training server TS1 has TCDs 402C and 402D, and training server TS((n/2)−1) has TCDs 402K an 402L.

In general, partitioning the MTSI across all TCDs, regardless of their inter RCD inter-TCD networking characteristics can cause significant communication overhead during training. As mentioned earlier, the overhead can scale with the number of participants involved in a given collective communication (such as an all-gather operation). In general, the efficiency of a distributed training workload in a heterogeneous networking environment (where inter-TCD network paths/channels have differing performance characteristics depending on servers within which the TCDs are incorporated) normally depends on the lower bandwidth collections, such as bandwidths between CDTs of different servers or bandwidths between CDTs at different racks.

To help reduce the communication overhead, the model training state information may instead be distributed over a subset of the available TCDs in various embodiments. A TCD such as a state of the art GPU may be able to store tens of gigabytes of data, so a few such TCDs may collectively suffice for MTSI of a model with tens of billions of parameters. The MTSI of some models with as 10 billion parameters has been measured to be in the range of 150-200 gigabytes, for example, which can be accommodated at a server with eight TCDs with 32 GB of memory each. By using such a small number of TCDs, the scale of much of the communication required during training can be reduced substantially. If all the TCDs used for storing a replica of the MTSI are part of the same training server, high-speed intra-server network interconnects/paths can be used for much of the training traffic.

In the embodiment depicted in FIG. 4, the TCDs of the resource set are subdivided into partition groups (PGs), such that each PG has the same number of TCDs (two), and such that the TCDs of a given PG can collectively accommodate an entire replica of the MTSI. Approximately half of the MTSI can be accommodated at each TCD in the depicted example scenario. Each TCD of a resource group or cluster may be assigned a number of different identifiers referred to as ranks in various embodiments: a cluster rank (CR), a partition rank (PR) and a server rank (SR). Each TCD gets a unique CR: the n TCDs are assigned CRs from 0 to (n−1). Within a given PG, each TCD is assigned a respective PR from 0 to p−1 (in FIG. 2, p, the number of TCDs that are needed to store a replica of the MTSI is 2 according to the notation introduced above, so PRs range from 0 to 1). Further, each TCD within a server may also be assigned a respective server rank; since the number of TCDs per server (k in the notation scheme introduced above) is 2 in the example shown in FIG. 4, SRs also range from 0 to 1. Thus, for example, TCD 402A at training server TS0 is assigned to partition group PG0, and has a CR=0, PR=0, and SR=0. TCD 402B at training server TS0 is also assigned to partition group PG0, and has a CR=1, PR=1, and SR=1. TCD 402C at training server TS1 is assigned to partition group PG1, and has a CR=2, PR=0, and SR=0, and so on.

Each of the available TCDs of the resource group may also be assigned to a replication group (RG) such as RG0 or RG1 in the depicted embodiment. The TCDs of a given RG each have the same PR (e.g., all TCDs with PR=0 are in RG1), and are configured to store the same subset of the MTSI. During the training of the model, when for example a parameter tensor is needed for forward or backward computation, an all-gather collective communication operation may be invoked in some embodiments to acquire the corresponding model parameters at the TCDs of a given PG. After the gradients are computed on the TCDs, an all-reduce collective communication operation may be employed in at least some embodiments to aggregate gradients across all the devices of the PG, and then the gradients may also be partitioned within each PG.

Assume that C_all is used to denote the time cost of a partition-to-all strategy in which the entire MTSI is distributed uniformly among all available TCDs (which may be an approach used by some state of the art distributed training techniques which do not employ communication scale reduction strategies of the kind introduced herein), B_all denotes the effective bandwidth among all the TCDs for collective communication, and C_sr is defined as the time cost of a communication scale reduction strategy for collective communication using PGs. It can be shown that the following inequality may hold (at least approximately) in at least some embodiments: (C_all/C_sr>=Bg/B_all). Recall that Bg is the effective bandwidth within a given PG for collective communication. For models that can be partitioned to devices located on a single server, the ratio Bg/B_all can be quite high, so the time cost reduction achieved by using the communication scale reduction techniques can also be quite high (e.g., on the order of 10 times speedup may be obtained). Even in scenarios in which PG TCDs are distributed among several servers, substantial cost reductions have been measured using the partitioning approach relative to an approach in which the MTSI is simply distributed among all the available TCDs.

Figure 5:
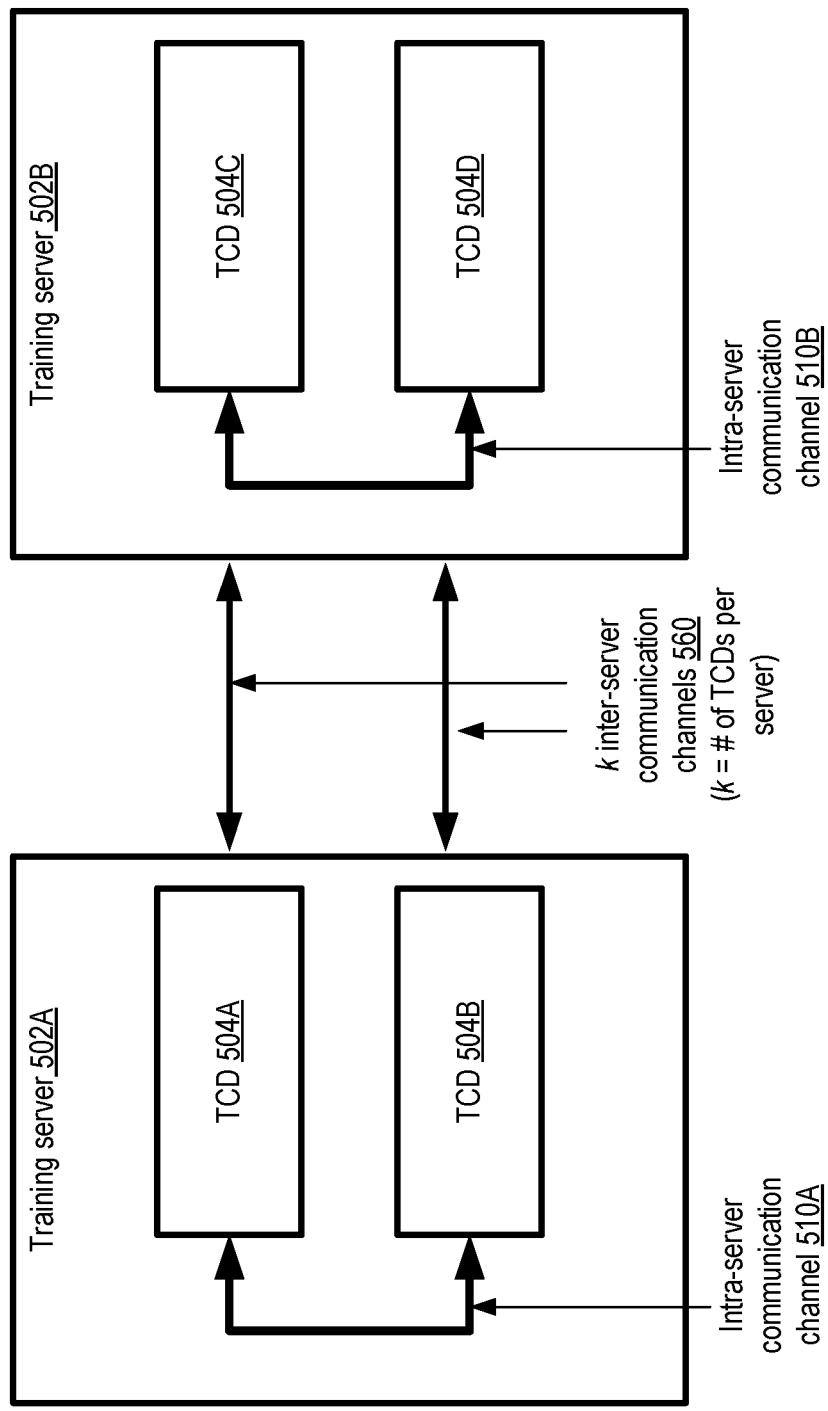
FIG. 5 illustrates example types of communication channels which may be established for training a machine learning model using multiple training servers, according to at least some embodiments.

FIG. 5 illustrates example types of communication channels which may be established for training a machine learning model using multiple training servers, according to at least some embodiments. Such communication channels may for example be created by invoking APIs of one or more networking libraries utilized by the MLS in some embodiments. In at least one embodiment, if a pair of training servers (such as 502A and 502B) each comprise k TCDs, at least k inter-server communication channels 560 may be established, e.g., by communication channel managers of the kind introduced in FIG. 1. In the example scenario shown in FIG. 5, k=2. This may enable k different messages or message streams to be transferred in parallel if needed between the two servers at various stages of the training of a model, e.g., during an inter-training-server all-gather operation. This approach is in contrast to the approach taken in other distributed training methodologies, in which a single channel may typically be set up for communication between training servers. In some embodiments, high-bandwidth fiber fabric may be available for inter-server communication. For local or intra-server communications, one or more intra-server communication channels such as 510A (linking TCD 504A with TCD 504B) or 510B (linking TCD 594C with TCD 504D) may be set up at each training server 502 in the depicted embodiment. In some cases, the training servers 502 may include TCD-to-TCD hardware interconnects (conceptually similar to NVLINKS) and/or all-TCD-to-all-TCD interconnects/switches (similar in concept to NVSwitches) which can be used for transferring the intra-server messages. Other types of communication channels (such as channels for communication across racks or across data centers) may be used instead or in addition to the channels shown in FIG. 5 in some embodiments. In at least one embodiment, the communication channels may be created in a preparatory step prior to the initiation of training iterations.

Figure 6:
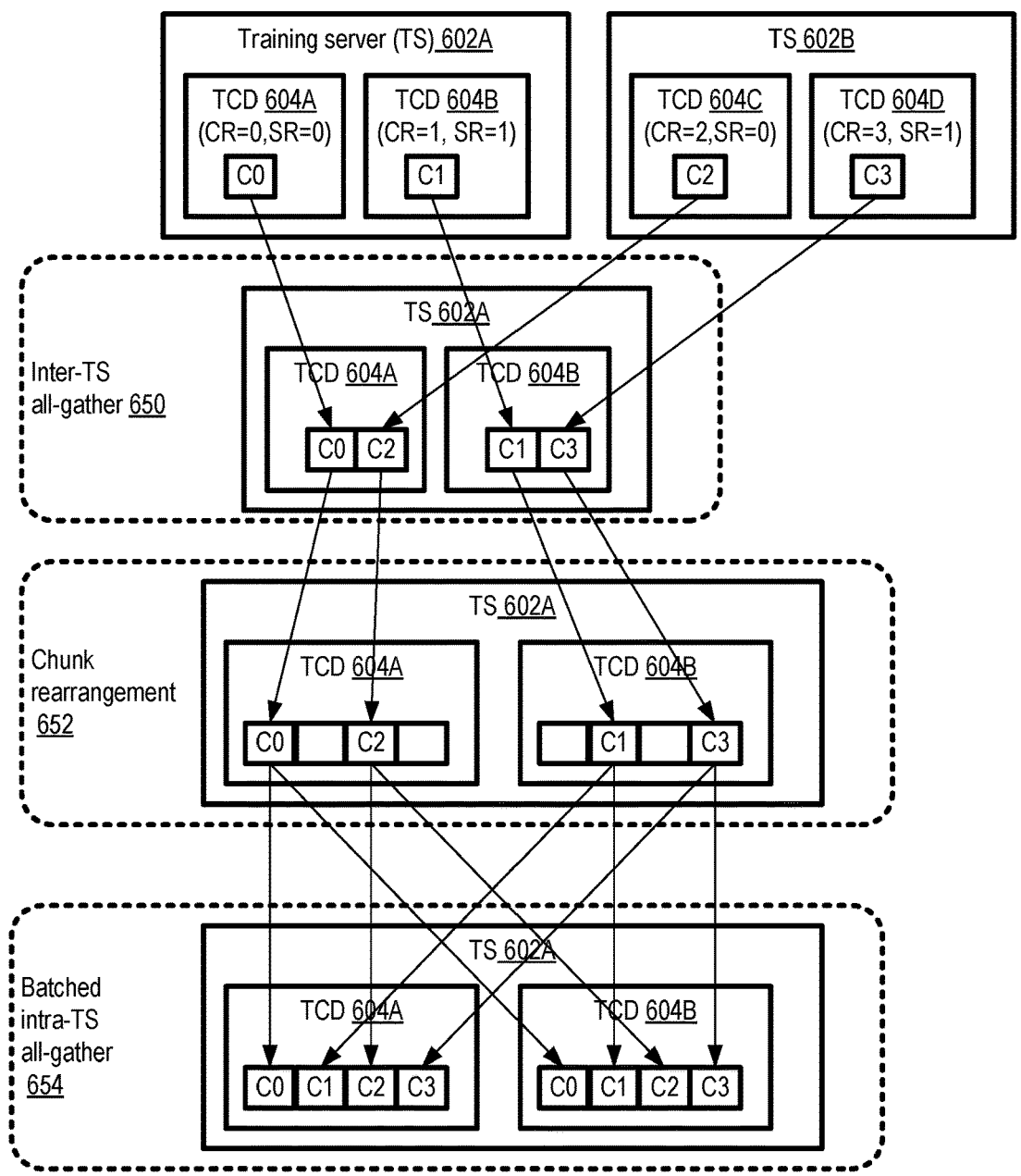
FIG. 6 illustrates an example use of a hierarchical communication strategy during forward or backward pass training computations of a machine learning model, according to at least some embodiments.

FIG. 6 illustrates an example use of a hierarchical communication strategy during forward or backward pass training computations of a machine learning model, according to at least some embodiments. The number of TCDs required for model training may sometimes exceed the number of TCDs on a given training server, so inter-server communication may be required. If, for example, a message of size M is to be gathered (using all-gather or a similar collective communication algorithm) among p participants, the data traffic transmitted is (p−1)*M/p. In at least some embodiments, the p participants may be split into smaller groups, with independent communications performed per group. A 2-dimensional topology may be utilized in some embodiments for hierarchical communication, where the data is first aggregated across training servers in parallel, and then local data is merged on each training server.

In the embodiment depicted in FIG. 6, a multi-stage algorithm may be used for gathering a subset of the MTSI at four TCDs of a partition group, split across two training servers. Gathering may also be referred to as redistributing, and may represent one example of a collective communication operation commonly used in distributed training of machine learning models. Training server (TS) 602A comprises TCD 604A and TCD 604B, while TS 602B comprises TCD 604C and TCD 604D. The cluster ranks (CRs) of the TCDs 604A, 604B, 604C and 604D are 0, 1, 2 and 3 respectively, while the server ranks (SRs) of the TCDs are TCDs 604A, 604B, 604C and 604D are 0, 1, 0 and 1, respectively. Assume that four sub-units or chunks of training state data C0, C1, C2 and C3, currently resident at TCDs 604A, 604B, 604C and 604D respectively are to be gathered, such that after the gathering operation, all 4 TCDs have all 4 chunks arranged in the order C0-C1-C2-C3 in respective memories. The chunks C0, C1, C2, C3 may comprise, for example, respective portions of a model parameter tensor or model parameter vector.

Inter-TS all-gather 650 is the first stage of the multi-stage gathering operation in the depicted embodiment. In this stage, inter-server communication channels between TS 602A and 602B may be used to transfer at least some of the chunks of the state information among TCDs with the same SR values. For example, chunk C2 may be transferred from TCD 604C to TCD 604A (both of which have SR 0), while chunk C3 may be transferred from TCD 604D to TCD 604B (both of which have SR 0). At least some of the inter-TS all-gather operations may be executed in parallel in at least some embodiments, using the multiple server-to-server channels mentioned above. Note that to avoid clutter, only a subset of the transfers performed during the multi-stage gathering are shown in FIG. 6—for example, C0 may also be transferred to TCD 604C from TCD 604A, while C1 may be transferred from TCD 604B to TCD 604D.

In the chunk rearrangement stage 652 of the multi-stage gathering, the state information chunks at each of the TCDs may be re-ordered in memory to ensure correctness. For example, in a memory section at TCD 604A that can store C0, C1, C2 and C3, C2 may be moved/copied from a position contiguous to C0 to a position that allows C1 to eventually be stored between C0 and C2. Such rearrangements or re-orderings may be required because the inter-TS all-gather operation may place the gathered chunks (such as C0 and C2) contiguously with respect to one another, and the chunks may need to eventually be stored in the same order C0-C1-C2-C3 at every TCD as mentioned above. At TCD 604B, chunks C1 and C3 may be reordered/repositioned in a similar manner during the chunk rearrangement stage 652. Chunks may also be re-ordered at TCDs 604C and 604D, e.g., in parallel with the reordering at the other TCDs. The chunk rearrangement or reordering stage may not require any messages to be transmitted via the communication channels in the depicted embodiment.

In a third stage of the multi-stage gathering, referred to as batched intra-TS all-gather 654, intra-server communication channels may be employed to gather the remaining chunks at each TCD from the other TCD at the same server in the depicted embodiment, without using inter-server communication channels. Thus, C1 and C3 may be obtained at TCD 604A from TCD 604B, C0 and C2 may be obtained at TCD 604B from TCD 604A, and so on. In various embodiments, the intra-TS all gather operations at a given server may be performed in a batch, e.g., using batch or coalesced collective communication APIs which may be implemented as extensions/customizations of existing machine learning frameworks. In some embodiments, the multi-stage gathering operation may not necessarily require all the stages discussed above—e.g., rearrangement of the chunks may not necessarily be required in a separate stage.

An estimate of the performance benefits of using the hierarchical communication strategy illustrated in FIG. 6 may be obtained as follows. Assume the model MTSI (size M) is partitioned among p TCDs, and p is divisible by k (the number of TCDs per server). Using conventional communication strategies, the inter-TS traffic is (p−1)*M/p. Using the proposed hierarchical communication, the volume of data transmitted over inter-TS channels is reduced to (p−k)*M/p. Thus, the volume of slower inter-TS traffic is reduced by (p−1)/(p−k). Given that p>=k>=1, this ratio decreases monotonically and approaches 1 as p becomes very large; thus, the improvement may be lower when more TCDs are needed to store the MTSI. In practice, p can be kept fairly low for state of the art models, so the inter-TS data transfer volume reduction is typically quite substantial.

Figure 7:
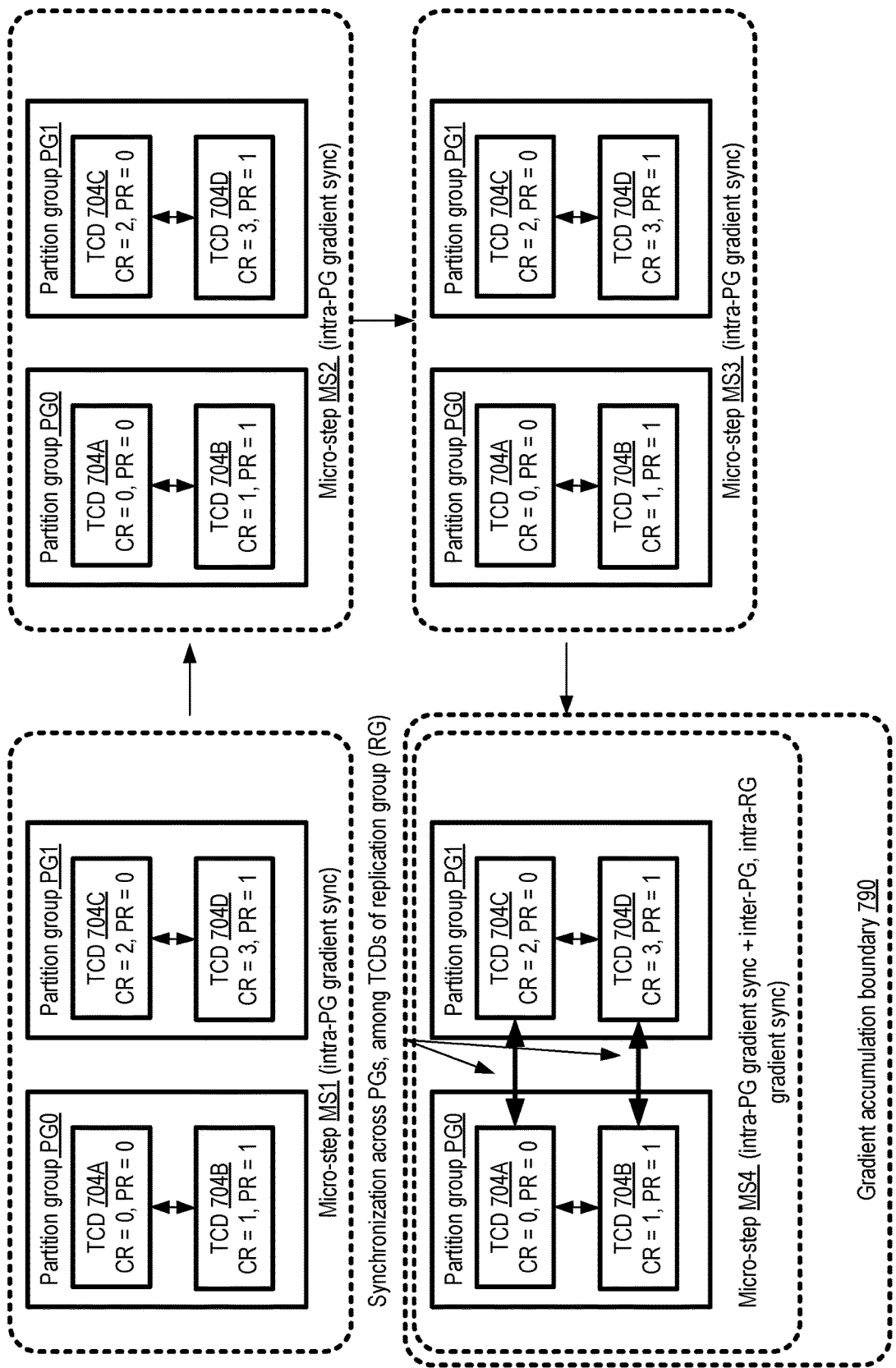
FIG. 7 illustrates an example use of a multi-level gradient synchronization technique that may be employed during machine learning model training, according to at least some embodiments.

FIG. 7 illustrates an example use of a multi-level gradient synchronization technique that may be employed during machine learning model training, according to at least some embodiments. In some traditional distributed training techniques, gradients have to be aggregated across all the TCDs being used. Gradient aggregation, which is required to ensure that all TCDs work on the same model states, is an expensive synchronization step and its cost can scale with the number of training worker threads. To improve training efficiency, large-batch training may be employed in various embodiments. However, due to limited TCD memory sizes, large batches may have to be divided into multiple micro-batches, with gradients being accumulated with respect to each micro-batch in a shared memory buffer in some approaches. In a standard data parallel approach, gradient synchronization may be needed only at accumulation boundaries after all the gradients have been computed. In scenarios in which gradients are partitioned (as part of MTSI partitioning), additional gradient synchronization may be needed for each micro-step (a micro-step comprises processing of a micro-batch). Since each TCD is only responsible for storing a part of the gradient, the gradient needs to be partitioned once it is computed, and in order to avoid losing gradient information, the gradients may have to be aggregated before the partition. This can make every gradient partitioning a global synchronization barrier.

In the proposed CSR approach, however, since the MTSI is only split among a relatively small number of TCDs (the TCDs of a partition group), gradient synchronization can be restricted to within a partition group for micro-batches, and global gradient synchronization can be deferred until an accumulation boundary is reached (e.g., when the entire batch has been processed). This motivates the design of the multi-level gradient synchronization utilized in various embodiments. For each micro-step, gradients are synchronized only within a partition group, and synchronization across partition groups is deferred until accumulation boundaries. The cross-partition-group synchronization is performed among TCDs assigned to the same replication group in at least some embodiments. The intra-PG gradient synchronization represents the first level or first hop of the multi-level gradient synchronization, and the inter-PG (intra-RG) gradient synchronization represents the second level or second hop.

In the embodiment depicted in FIG. 7, partition group PG0 of a resource set comprises TCD 704A (CR=0, PR=0), and TCD 704B (CR=1, PR=1), while partition group PG1 comprises TCD 704C (CR=2, PR=0) and TCD 704D

(CR=3, PR=1). Addition partition groups may also be used for the training, but are not shown in FIG. 7. Assume that 4 micro-steps are performed between accumulation boundaries (e.g., 4 micro-steps per batch). In micro-step MS1, gradients are synchronized only within PGs—e.g., gradients are synchronized among TCDs 704A and 704B, and gradients are synchronized among TCDs 704C and 704D. Similarly, in micro steps MS2 and MS3, gradients are only synchronized within PGs, also without crossing partition group boundaries. In at least one embodiment, a reduce-scatter operation may be used for the synchronization within a PG. At the gradient accumulation boundary 790 (corresponding to micro-step MS4 in the example shown in FIG. 7, after all 4 micro-batches are processed), an all-reduce operation may be employed within each replication group to synchronize gradients across PGs, e.g., in addition to the local per-PG synchronization performed at each micro-step. Thus, gradient synchronization may be performed between TCD 704A and TCD 704C, both of which have PR=0 and hence belong to the same replication group. Similarly, gradient synchronization may be performed between TCD 704B and TCD 704D, both of which have PR=1 and hence belong to the same replication group (RG). Thus, at gradient accumulation boundary 790, synchronization of gradients may include transmitting messages across partition group boundaries.

The performance benefit of using the multi-level gradient synchronization scheme illustrated in FIG. 7 may depend on the number of micro steps and the effective communication bandwidths within PGs and within replication groups (RGs) in various embodiments. If we assume that s micro-steps are required, every PG has the same intra-PG bandwidth Bpg, every RG has the same intra-RG bandwidth Brg, and B_all denotes the effective bandwidth among all the TCDs, the time cost $C\_ml$ of the multi-level gradient synchronization scheme is obtained as $C\_ml=(s*M*(p-1))/p*Bpg+2M(n-p)/nBrg$, while the time cost for an alternative strategy $C\_alt$ which does not use the multi-level approach is obtained as $C\_alt=2*sM (n-1)/(n*Ball)$. The time cost ratio, $C\_alt/C\_ml$ can be shown to be $>=((2*s)/B\_all)/((s/Bpg)+(2/Brg))$. If we assume s=4, and B_all==Bpg==Brg for simplicity, at least a 25% cost reduction can be obtained using the multi-level gradient synchronization approach. Taking heterogeneous bandwidth into consideration, the cost reduction is even greater.

In at least some embodiments, as indicated above, a number of other optimizations may be employed in addition to scale-aware partitioning, hierarchical communication and multi-level gradient synchronization. These optimizations may include using fine-grained synchronization primitives for synchronizing between communication and computation operations during parameter gathering and gradient synchronization (e.g., fine grained primitive similar to wait_event, wait_stream and record_stream) instead of coarse grained TCD-level synchronization or stream synchronization in some embodiments. Coalesced communication APIs (such as all_gather_coalesced or reduce_scatter_coalesced) may be implemented in various embodiments to batch multiple communications together (e.g., during the intra-TS all-gather stage of the gathering of model state chunks discussed above). Such coalesced operations may reduce the amount of buffer allocation and copying that would otherwise be required for the communications. Grouping primitives supported by communication libraries (e.g., conceptually similar to the group primitive of nccl) may be employed in some embodiments to launch multiple communication operations concurrently. Memory defragmentation techniques may be employed in at least some embodiments to avoid out-of-memory errors. For example, large contiguous memory buffers may be allocated in advance at the TCDs for holding partitioned parameters and gradients in one embodiment. In at least one embodiment, parameter use decisions may be precomputed and cached for re-use at various points in the training. During the forward and backward passes, for example, many complex decisions may need to be made, relating to which parameters should be fetched, predicting which parameters will be used next, which parameters may be reused soon and should be kept, and which can be released. Making these decisions on-the-fly may create large computation and communication bubbles (e.g., involving periods of waiting before computations can proceed). Pre-computing and caching such decisions, which are reused at various points of the training, can help avoid such bubbles.

Figure 8:
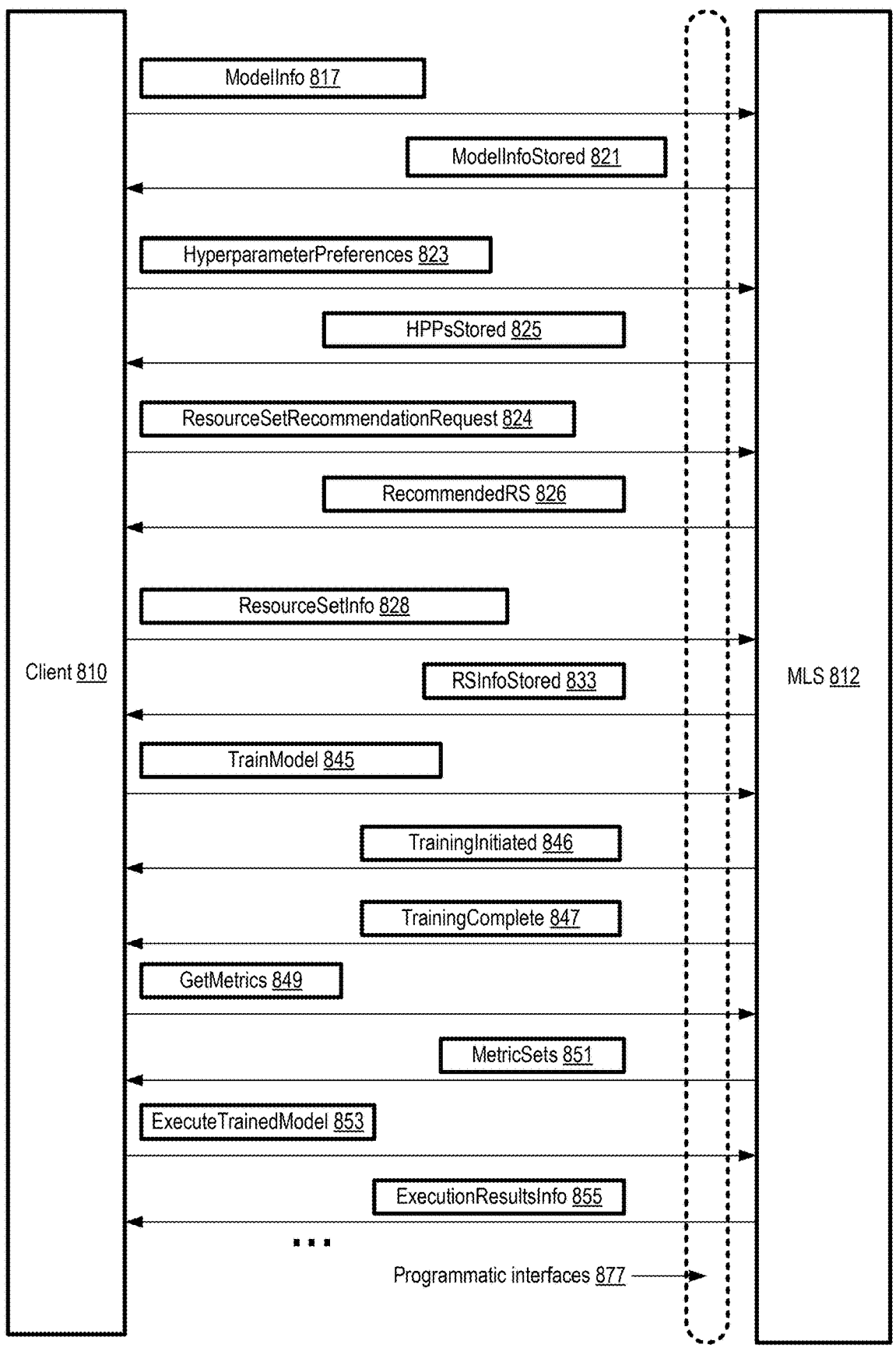
FIG. 8 illustrates example programmatic interactions associated with the distributed training of machine learning models, according to at least some embodiments.

FIG. 8 illustrates example programmatic interactions associated with the distributed training of machine learning models, according to at least some embodiments. An MLS 812 similar in functionality to MLS 102 of FIG. 1 may implement a set of programmatic interfaces 877 in the depicted embodiment, such as one or more web-based consoles, command-line tools, application programming interfaces (APIs), graphical user interfaces and the like.

Information about a model to be trained, such as the kind of problem which is to be solved using the model, the type of model (e.g., a transformer model, a convolution model, etc.), a pointer to the training data set, the total number of parameters of the model, an approximation or measurement of the size of model training state information (MTSI) and the like may be provided by the client via a ModelInfo message 817 in some embodiments. In some cases, source code of the model may be provided in a ModelInfo message, which can be analyzed by the MLS to determine some of the model properties mentioned above, including the MTSI size. The model information may be saved at the MLS 812, and a ModelInfoStored message 821 may be sent to the client in some embodiments.

Some MLS clients may provide preferred values or preferred ranges of model hyperparameters to be used during model training, e.g., via one or more HyperparameterPreferences messages 823. For example, clients may specify a learning algorithm, a loss function, training completion criteria (e.g., a desired level of prediction accuracy or a targeted deadline for training the model), the number (and types) of layers of a neural network to be used for the model, the number of artificial neurons per layer, batch sizes and micro-batch sizes to be used for the training iterations, batch selection algorithms, micro-batch selection algorithms, and so on. The model hyperparameter preferences may be stored at the MLS and an HPPsStored message 825 may be sent to the client in the depicted embodiment. In some embodiments, at least a subset of MLS clients may specify such model hyperparameters (and provide information about the model information state size), but leave the decisions regarding system configuration parameters (e.g., the number of partition groups, the number of replication groups etc.) to the MLS. In one embodiment, the MLS may tune such system configuration parameters automatically, without guidance from the MLS clients. In at least some embodiments, the model hyperparameter values may be specified as part of a ModelInfo message.

In at least some embodiments, the MLS may provide recommendations for cluster or resource set configurations to a client. The client may, for example, submit a ResourceSetRecommendationRequest 824 to the MLS via the programmatic interfaces 877, indicating for example that the client can acquire compute instances of some or all of several supported types of compute instances of a virtualized computing service (VCS) of a provider network, or providing a descriptor of a set of resources available to the client at a premise external to the provider network. If the client has not already provided information about the model via a ModelInfo message, similar information to the ModelInfo contents discussed above (e.g., model type, MTSI size etc.) may be included in the ResourceSetRecommendationRequest in some embodiments. The MLS may utilize the model information to identify a set of resources that can be used to train the model efficiently using the CSR techniques introduced herein (such as N1 compute instances of type T1, with each compute instance comprising N2 TCDs with a particular performance capacity). A RecommendedRS message 826 indicating the identified resources may be transmitted to the client in the depicted embodiment. In some embodiments, the MLS may not necessarily be provided with some details regarding the model (such as an estimate of the MTSI size) which may be needed to identify a recommended configuration. In such cases, the MLS may generate its own estimate for the MTSI size based on the model information available, and use the estimate for generating the recommendation. A mathematical or statistical model for estimating MTSI may be used in some embodiments. In various embodiments, the MLS may have information about the capabilities of different compute instance types supported by a VCS (e.g., instances with 8 GPUs of a particular type, instances with 16 GPUs of a particular type, etc.), or about resources at an external premise, and may use such information to generate a recommended configuration. In some embodiments, the MLS may generate several different recommended configurations (differing from one another for example in the number and types of training servers and/or connectivity between the training servers, which in turn can impact model training completion times), and the client may choose one such configuration for the model if desired.

A client 810 may use a ResourceSetInfo message 828 to provide an indication of a particular resource set (e.g., virtual or physical servers with some number of TCDs such as GPUs or other accelerators for machine learning tasks) that can be used for training the client's model in the depicted embodiment. In some cases, the resource set may be acquired by a client based on a recommendation provided by the MLS in a RecommendedRS message; in other cases, the client may send information about a chosen resource set without requesting or receiving a recommendation from the MLS. In at least one embodiment, the resource set(s) may include virtual machines or compute instances of a computing service of a provider network. In some embodiments, at least some resources at premises external to the provider network of the MLS may be used. The resource set information may be saved at the MLS, and an RSInfoStored message 833 may be sent to the client in some embodiments. In some cases, the ResourceSetInfo message 828 may not specify specific servers as such, and may instead provide an indication of a total resource budget and/or a total time budget, and the MLS may select specific servers based on the budget(s) and the model information.

A TrainModel request 845 may be submitted by the client 810 in various embodiments to request the training of the desired model. In some embodiments, some or all of the information described above as being provided in the ModelInfo message, the HyperparameterPreferences messages, and/or the ResourceSetInfo message may be included instead in the TrainModel request message. The MLS may start the operations needed to train the model (e.g., including partitioning of the resource set, establishment of the network channels, etc.), and send a TrainingInitiated message 846 to the client in one embodiment. After the training is terminated, e.g., either because the model has reached its goal prediction accuracy or because the time or resource budget has been exhausted), in some embodiments the MLS may store a trained version of the model and send a TrainingComplete message 847 to the client. In at least one embodiment, one or more model quality metrics of the trained model (such as prediction accuracy with respect to a test subset of the data set) may be provided to the client as well.

In at least one embodiment, the client may submit a GetMetrics request 849 to obtain metrics collected during the model training operations. In response, the MLS may use one or more MetricsSets messages 851 to provide metrics such as the average (and/or maximum) utilizations of processors of TCDs/GPUs/accelerators, memory, storage, networking devices etc. of the resource set(s) employed, the ratio of inter-host data transfers to intra-host data transfers, the total number of training iterations and/or micro-batch steps conducted, the time taken for training the model, and so on.

After the model has been trained and stored, an MLS client may submit an ExecuteTrainedModel request 853 indicating the input for which predictions/inferences are to be generated in various embodiments. The trained version of the model may be executed as requested at or by the MLS, and a set of results obtained may be provided or indicated to the client in one or more ExecutionResultsInfo messages 855 in various embodiments. In some embodiments, programmatic interactions related to the distributed training of machine learning models, other than the interactions shown in FIG. 8, may be supported by an MLS 812.

Figure 9:
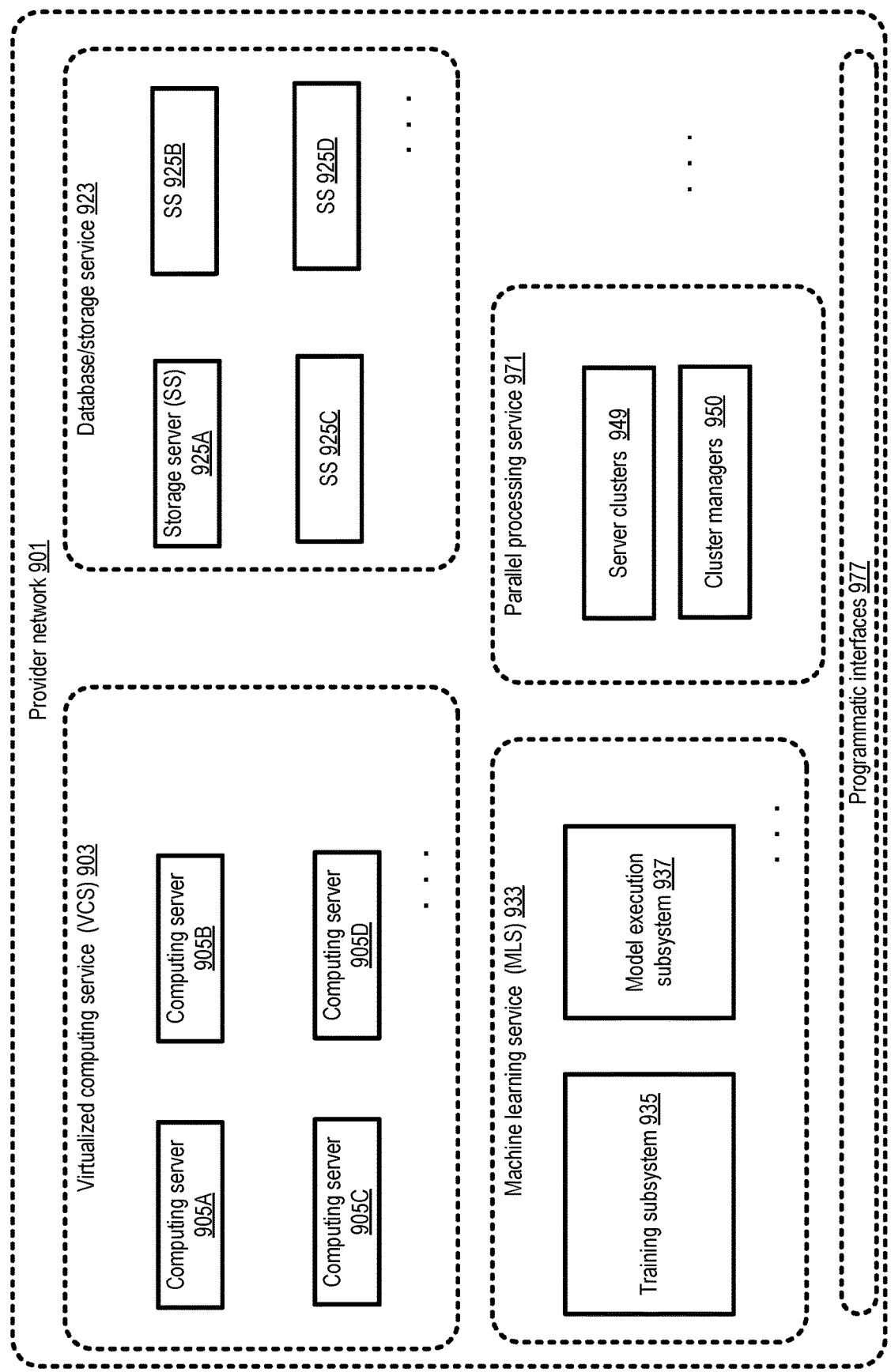
FIG. 9 illustrates an example provider network within which distributed training of machine learning models may be performed, according to at least some embodiments.

FIG. 9 illustrates an example provider network within which distributed training of machine learning models may be performed, according to at least some embodiments. In the depicted embodiment, provider network 901 may comprise resources used to implement a plurality of services, including for example a virtualized computing service (VCS) 903, a database/storage service 923, a parallel processing service 971 as well as an MLS 933. The MLS 933, similar in features and functionality to MLS 102 of FIG. 1, may comprise a training subsystem 935 and a model execution subsystem 937. In some embodiments a separate model training service may be implemented at a provider network instead of using a subsystem within a more general MLS. In at least one embodiment, the training subsystem 935 of the provider network may coordinate the distributed training of a model using resources at a premise external to the provider network, e.g., at a client-owned or client managed premise.

Components of a given service of a provider network may utilize components of other services in the depicted embodiment—e.g., for some tasks such as distributed training of large models using the communication scale reduction based techniques of the kind discussed above, virtual machines or compute instances implemented at computing servers such as 905A-905D of the virtualized computing service 903 may be used by the MLS, training data sets as well as model execution results may be stored at storage servers 925 (e.g., 925A-925D) of storage service 923, and so on.

For some types of machine learning tasks initiated at the MLS 933, such as the distributed training techniques introduced herein, server clusters 949 may be utilized with the help of cluster managers 950 in one embodiment. The cluster managers 950 may for example assign particular clusters to clients, keep track of cluster health and take administrative actions such as replacing failed or poorlyperforming servers, and the like. The server clusters may themselves comprise compute instances of the VCS in some cases. In at least one embodiment, a provider network service such as the VCS or the parallel processing service 971 may provide information about the inter-TCD communication capacity of various supported configurations (e.g., compute instances with differing numbers/speeds/memory sizes of GPUs, clusters of such compute instances co-located within individual servers/racks, and so on), and this information may be used by MLS clients to choose resource sets for their model training. Information about the bandwidth and/or latency for communication among TCDs of a given instance, communication among TCDs of different instances, and the like may be provided, for example. In some embodiments, the VCS and/or the parallel computing service may support several different types of interconnects for traffic flowing between compute instances or among TCDs of a given compute instance, and this information may be used by an MLS client (or by the MLS itself) to identify resource sets for model training. Individual ones of the services shown in FIG. 9 may implement a respective set of programmatic interfaces 977 which can be used by external and/or internal clients (where the internal clients may comprise components of other services) in the depicted embodiment.

FIG. 10 is a flow diagram illustrating aspects of operations which may be performed to train machine learning models using a distributed collection of resources, according to at least some embodiments. As shown in element 1001, an indication of a resource set (RS) to be used collectively to train a machine learning model such as a DNN may be obtained, e.g., via programmatic interfaces of a machine learning service (MLS) of a provider network. The identified RS may, for example, comprise a collection or cluster of servers of a provider network, and/or a collection of servers at a premise external to the provider network in various embodiments. Individual ones of the servers, which may be referred to as training servers (TSs) may include some number of training computing devices (TCDs, such as GPUs/accelerators). In the depicted embodiment, the RS may be considered heterogeneous in that the network bandwidth and latencies of paths connecting different pairs of TCDs may differ, e.g., depending on whether both TCDs are within the same TSs, at different TSs within a rack, on different racks, in different rooms/sections of a data center, etc.

Based on one or more factors such as the size of the model's training state information (MTSI, which may be provided to the MLS or estimated/computed at the MLS), the number of TCDs of RS, the memory sizes of the TCDs, client preferences, etc., RS may be subdivided/arranged into P partition groups (PGs) in the depicted embodiment (element 1004), such that a replica of the entire MTSI can fit within the memories of the TCDs of any given PG. Of course, each TCD may also use some subset of its memory for other objects, so the entire memory may not necessarily be available for the MTSI portion—e.g., out of 16 GB of memory at a TCD, no more than 12 GB may be usable for MTSI, and such constraints may be used in mapping TCDs to partition groups. Each TCD may be assigned to a respective replication group (RG), such that all TCDs within a given RG store a replica of the same subset of MTSI in some embodiments. Each TCD may be assigned a respective cluster index/rank (CR), partition rank (PR) and server rank (SR) in some embodiments to help simplify the orchestration of data transfers during the training. The ranks may be assigned such that (a) each TCD in the RS has a distinct CR, (b) within a given PG, each TCD has a different PR, and (c) within a given TS, each TCD has a different SR. All the TCDs (in various PGs) which have the same PR may be assigned as members of the same RG. Note that these ranks/identifiers may not necessarily be stored persistently and/or exposed to clients of the machine learning service in various embodiments; instead, they may be used internally for the distributed training steps such as model parameter gathering, gradient synchronization etc. In some embodiments, only a subset of the three types of ranks (e.g., only CRs and PRs) may be used.

In the embodiment depicted in FIG. 10, communication channels of at least two types may be established between various TCDs of the RS (element 1007), e.g., using APIs, functions or primitives of a networking library supported at the RS. Inter-TS communication channels (e.g., k channels between a given pair of TSs, where k is the number of TCDs per TS) as well as intra-TS communication channel(s), may be set up for collective communication operations (such as all-gather, reduce-scatter, all-reduce etc.) during various stages of the training of the model. In some implementations, the number of inter-server channels may be different from the number of TCDs per TS.

In various embodiments, a set of batch training iterations of the model (e.g., with each batch corresponding to a respective sample of training data, and with each batch being sub-divided into micro-batches with intra-PG gradient synchronization per micro-batch, followed by intra-RG gradient synchronization at the accumulation boundaries or batch boundaries) may be conducted (element 1010). A given iteration may include forward and/or backward parameter computations, during which a hierarchical communication strategy may be used to transfer/gather model training state information such as parameter tensors/vectors at the different TCDs of a given PG. The gathering of model training state information may, for example, include inter-TS all-gather operations of state data chunks using inter-TS channels, reordering/rearrangement of the chunks within memory at individual TCDs, and intra-TS all-gather operations as discussed in the context of FIG. 6. In at least some embodiments, the parameter tensors/vectors may not have to be transferred or transmitted across partition group boundaries. Note that in some embodiments, hierarchical communication may be used for training a given model, but a multi-level gradient synchronization may not be used. Alternatively, in some embodiments, multi-level gradient synchronization may be used, but hierarchical communication may not be used.

A trained version of the model, obtained after all the iterations are completed, may be stored at the MLS (element 1013). Inferences or predictions may then be generated using the trained version of the model, and indications of the inference results/predictions may be provided via the programmatic interfaces of the MLS (element 1016).

It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Figure 11:
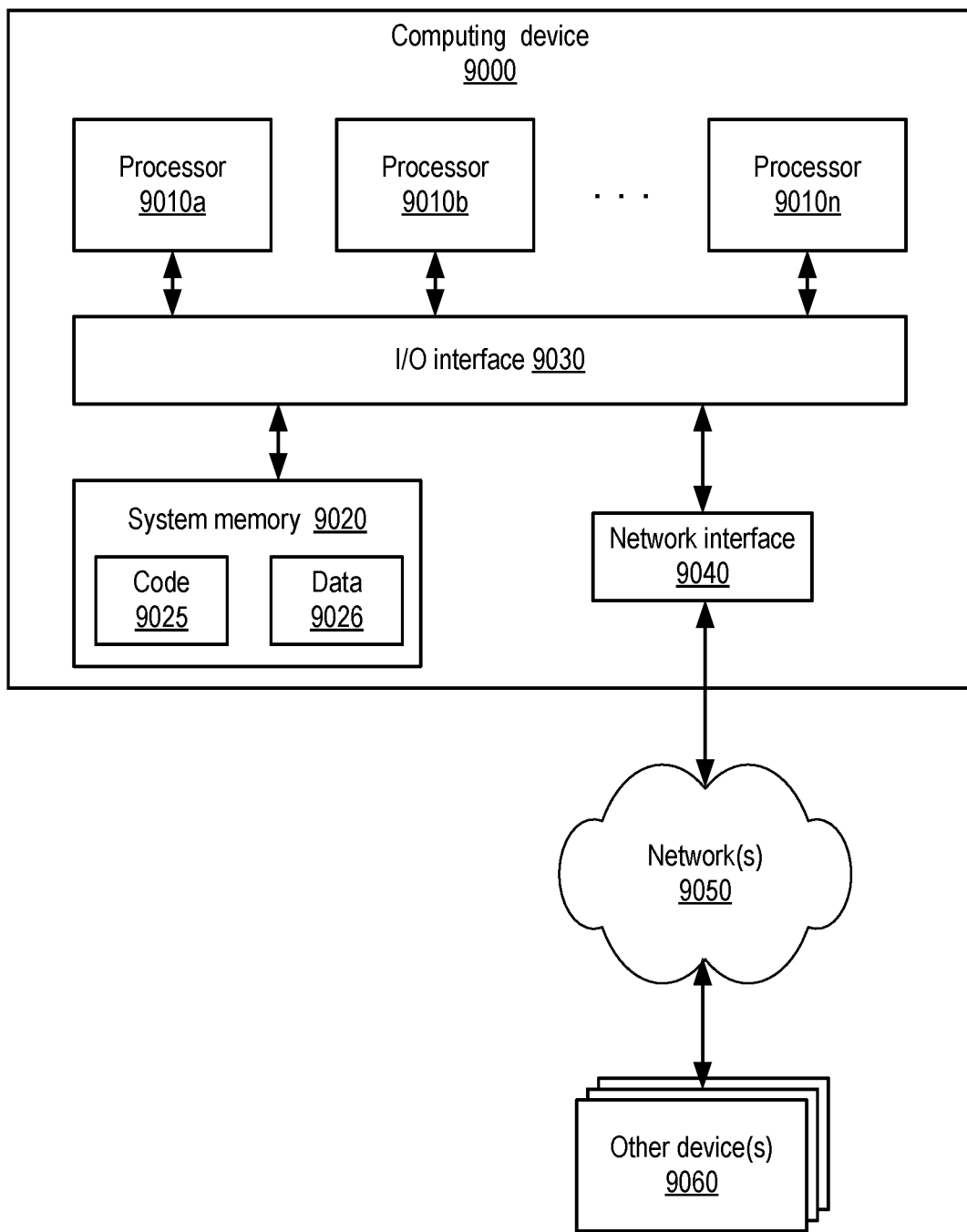
FIG. 11 is a block diagram illustrating an example computing device that may be used in at least some embodiments.

In at least some embodiments, a server that implements the types of techniques described herein (e.g., various functions of an MLS, a VCS and other services of a provider network), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) and/or other types of computation accelerators may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
identify, at a machine learning service of a provider network, a resource set for training a model, wherein the resource set comprises a plurality of servers, wherein individual ones of the servers comprise a respective plurality of training computing devices, wherein an available communication bandwidth between a pair of training computing devices within a server differs from an available communication bandwidth between a training computing device at a first server and a training computing device at another server;
divide the resource set into a plurality of partition groups, such that an aggregate memory capacity of training computing devices of a partition group is sufficient to store a respective replica of training state information of the model;
train the model using the plurality of partition groups, wherein individual ones of the partition groups are used to process respective subsets of a training data set, and wherein training of the model comprises:
gathering a portion of the training state information at training computing devices of a particular partition group in multiple stages, wherein a particular stage of the multiple stages comprises utilizing an inter-server communication channel to transfer a set of sub-units of the portion between training devices of respective servers, and wherein another stage of the multiple stages comprises utilizing an intra-server communication channel to transfer one or more of the sub-units between training devices of a server without utilizing an inter-server communication channel; and
performing multi-level gradient synchronization, wherein a first level of the multi-level gradient synchronization comprises synchronizing gradients among training computing devices within a partition group without sending messages across partition group boundaries, and wherein a second level of the multi-level gradient synchronization comprises synchronizing gradients among training devices across partition group boundaries; and
provide an inference obtained using a trained version of the model.

2. The system as recited in claim 1, wherein a server of the resource set comprises a compute instance of a virtualized computing service of the provider network.

3. The system as recited in claim 1, wherein a training computing device comprises one or more of: (a) a graphics processing unit (GPU) or (b) a chipset for accelerating model training computations.

4. The system as recited in claim 1, wherein the training state information of the model includes one or more of: (a) model parameters, (b) gradients, or (c) optimizer states.

5. The system as recited in claim 1, wherein the one or more computing devices include further instructions that upon execution on or across the one or more computing devices:
estimate, based at least in part on input received via one or more programmatic interfaces of the machine learning service, a size of the training state information; and
utilize an estimated size of the training state information to determine the number of training computing devices included in a partition group.

6. A computer-implemented method, comprising:
dividing a resource set into a plurality of partition groups, wherein the resource set comprises a plurality of servers and is to be used to train a machine learning model, and wherein individual servers of the resource set comprise a respective plurality of training computing devices, such that an aggregate memory capacity of training computing devices of a partition group is sufficient to store a respective replica of training state information of the machine learning model;
training the machine learning model using the plurality of partition groups, wherein individual ones of the partition groups are used to process respective subsets of a training data set, and wherein training of the machine learning model comprises gathering a portion of the training state information at training computing devices of a particular partition group in multiple stages, wherein a particular stage of the multiple stages comprises utilizing an inter-server communication channel to transfer a set of sub-units of the portion between training devices of respective servers, and wherein another stage of the multiple stages comprises utilizing an intra-server communication channel to transfer one or more of the sub-units between training devices of a server; and
storing a trained version of the machine learning model.

7. The computer-implemented method as recited in claim 6, wherein a training computing device comprises one or more of: (a) a graphics processing unit (GPU) or (b) a chipset for accelerating model training computations.

8. The computer-implemented method as recited in claim 6, wherein the training state information of the model includes one or more of: (a) model parameters, (b) gradients, or (c) optimizer states.

9. The computer-implemented method as recited in claim 6, wherein training of the model further comprises:
performing multi-level gradient synchronization, wherein a first level of the multi-level gradient synchronization comprises synchronizing gradients among training computing devices within a partition group without sending messages across partition group boundaries, and wherein a second level of the multi-level gradient synchronization comprises synchronizing gradients among training devices across partition group boundaries.

10. The computer-implemented method as recited in claim 9, further comprising:
assigning individual training computing devices of a partition group to respective replication groups, wherein individual training computing devices within a replication group store are members of different partition groups, wherein individual training computing devices within a replication group store respective replicas of a subset of the training state information, and wherein, in the second level of the multi-level gradient synchronization, gradients are synchronized among the training computing devices of a replication group.

11. The computer-implemented method as recited in claim 6, further comprising:
establishing a plurality of inter-server communication channels between a pair of servers of the resource set, wherein the number of inter-server communication channels established between the pair of servers is based at least in part on the number of training computing devices at a server of the pair of servers, and wherein during training of the machine learning model, training state information is transferred in parallel between multiple pairs of training computing devices using the plurality of inter-server communication channels.

12. The computer-implemented method as recited in claim 6, further comprising:
estimating, based at least in part on input received via one or more programmatic interfaces, a size of the training state information of the machine learning model; and
utilizing an estimated size of the training state information to determine the number of training computing devices included in a partition group.

13. The computer-implemented method as recited in claim 6, further comprising:
providing, via one or more programmatic interfaces, a set of metrics pertaining to training of the machine learning model, wherein the set of metrics includes one or more of: a processor utilization metric, a memory utilization metric, a storage utilization metric, a network utilization metric, a network latency metric, a ratio of inter-server transfers to intra-server transfers, a number of training iterations conducted, or a quality metric of the machine learning model.

14. The computer-implemented method as recited in claim 6, wherein a server of the resource set comprises a compute instance of a virtualized computing service of a provider network.

15. The computer-implemented method as recited in claim 6, further comprising:
receiving, via one or more programmatic interfaces, one or more hyperparameters used for training the machine learning model, wherein the one or more hyperparameters include one or more of: a learning algorithm, a loss function, a number of layers of a neural network, a batch size of training data, or an algorithm for selecting batches from a training data set.

16. One or more non-transitory computer-accessible storage media storing program instructions that when executed on or across one or more processors:
divide a resource set into a plurality of partition groups, wherein the resource set comprises a plurality of servers and is to be used to train a machine learning model, and wherein individual servers of the resource set comprise a respective plurality of training computing devices, such that an aggregate memory capacity of training computing devices of a partition group is sufficient to store a respective replica of training state information of the machine learning model;
train the machine learning model using the plurality of partition groups, wherein individual ones of the partition groups are used to process respective subsets of a training data set, and wherein training of the machine learning model comprises gathering a portion of the training state information at training computing devices of a particular partition group in multiple stages, wherein a particular stage of the multiple stages comprises utilizing an inter-server communication channel to transfer a set of sub-units of the portion between training devices of respective servers, and wherein another stage of the multiple stages comprises utilizing an intra-server communication channel to transfer one or more of the sub-units between training devices of a server; and
store a trained version of the machine learning model.

17. The one or more non-transitory computer-accessible storage media as recited in claim 16, wherein a training computing device comprises one or more of: (a) a graphics processing unit (GPU) or (b) a chipset for accelerating model training computations.

18. The one or more non-transitory computer-accessible storage media as recited in claim 16, wherein the training state information of the model includes one or more of: (a) model parameters, (b) gradients, or (c) optimizer states.

19. The one or more non-transitory computer-accessible storage media as recited in claim 16, wherein training of the machine learning model further comprises:
performing multi-level gradient synchronization, wherein a first level of the multi-level gradient synchronization comprises synchronizing gradients among training computing devices within a partition group without sending messages across partition group boundaries, and wherein a second level of the multi-level gradient synchronization comprises synchronizing gradients among training devices across partition group boundaries.

20. The one or more non-transitory computer-accessible storage media as recited in claim 16, wherein the machine learning model comprises a neural network.

* * * * *